United States Patent [19]

Regnault

[11] Patent Number: 4,998,116

[45] **Date of Patent: * Mar. 5, 1991**

[54] MULTIFUNCTIONAL CELL WITH A VARIABLE VOLUME CHAMBER AND A FLUID SUPPLY CIRCUIT FOR AN INK JET PRINTING HEAD

[75] Inventor: Luc Regnault, Bourg Les Valence, France

[73] Assignee: Imaje SA, Bourg Les Valence, France

[ * ] Notice: The portion of the term of this patent subsequent to Mar. 20, 2007 has been disclaimed.

[21] Appl. No.: 384,804

[22] Filed: Jul. 25, 1989

Related U.S. Application Data

[63] Continuation of Ser. No. 127,767, Dec. 2, 1987, Pat. No. 4,910,529.

[30] Foreign Application Priority Data

| | | | |
|---|---|---|---|
| Dec. 10, 1986 | [FR] | France | 8617385 |
| Aug. 26, 1987 | [FR] | France | 8712008 |

[51] Int. Cl.[5] ........................ G01D 15/18; F17D 1/00; F04B 49/00; F16K 31/02

[52] U.S. Cl. .................................. 346/75; 346/140 R; 137/12; 137/92; 251/129.04; 417/18

[58] Field of Search ............... 346/75, 140 R; 137/12, 137/92; 251/129.04; 417/18

[56] References Cited

U.S. PATENT DOCUMENTS

| | | | |
|---|---|---|---|
| 3,855,129 | 12/1974 | Abrahams et al. | 210/198.2 |
| 3,990,295 | 11/1976 | Renovanz et al. | 73/55 |
| 4,121,222 | 10/1978 | Diebold et al. | 346/75 |
| 4,270,133 | 5/1981 | Shimazawa et al. | 346/140 R |
| 4,314,264 | 2/1982 | Bok et al. | 346/140 R |
| 4,318,114 | 3/1982 | Huliba | 346/140 R |
| 4,357,617 | 11/1982 | Shimazawa et al. | 346/140 R |
| 4,359,312 | 11/1982 | Funke et al. | 417/18 |
| 4,464,668 | 8/1984 | Komai et al. | 346/75 |

FOREIGN PATENT DOCUMENTS

| | | | |
|---|---|---|---|
| 55-161660 | 12/1980 | Japan | 346/140 R |

*Primary Examiner*—Bruce A. Reynolds
*Assistant Examiner*—Gerald E. Preston
*Attorney, Agent, or Firm*—Oblon, Spivak, McClelland, Maier & Neustadt

[57] ABSTRACT

The invention provides a cell having a variable volume chamber and a fluid supply circuit for an ink jet printing head which is equipped therewith. The cell includes a variable volume chamber (1) connected to a pressure sensor (5) and to at least a pair of valves (7, 9) each associated with a restriction (8, 10). The variation of volume is obtained by means of a piston actuated by an eccentric (3) secured to the rotor of a stepping motor (4). The maximum pressure difference generated at the ends of the restrictions (8, 10) is used to measure the viscosity of the fluid which flows through the corresponding valves (7, 9).

54 Claims, 17 Drawing Sheets

MULTIFUNCTIONAL CELL WITH A VARIABLE VOLUME CHAMBER AND A FLUID SUPPLY CIRCUIT FOR AN INK JET PRINTING HEAD

This is a continuation of application Ser. No. 07/127,767, filed on Dec. 2, 1987, now U.S. Pat. No. 4,910,529.

FIELD OF THE INVENTION

The invention relates to a cell having a flow and measuring the viscosity, homogeneity, functions such as the functions of generating a fluid flow, measuring viscosity, homogeneity of the fluid, and temperature of the fluid positioning the rotor of a motor, etc.

The invention also relates to the application of such cells adapted so that they lead to the construction of a hydraulic circuit for supplying a continuous ink jet printing head, the essential quality of which circuit is, through the use of such a cell, that it is extremely compact and is therefore suitable for high operational and reliability performances.

BACKGROUND OF THE INVENTION

Although the application to ink jets of a cell according to the invention is not limitative, it is this application which will be described in greater detail in the following description. We find in fact an illustration of the main functions which such a cell may accomplish taken separately or in combination with another cell. It should be recalled here what are the particular requirements which a circuit must comply with for supplying a continuous ink jet printing head with ink. It is a question more particularly:

of generating an ink jet the flow rate is generally less than 20 $cm^3$/min and this at a pressure which may reach 4 bars;

of residual fluctuations in the supply pressure of less than 1%;

of recovering and recycling the whole of the ink flow generated that is not used for printing;

of the possibility of using inks with very volatile solvents making rapid drying possible on nonporous materials—such as metal or glass, for example;

of high reliability; and of completely automatic operation in an industrial environment, without maintenance and without a demanding cleaning procedure before prolonged shut down of the supply circuit.

In the ink jet marking printers known at present, different solutions have been chosen for complying with the above expressed requirements. For example, gear pumps are used providing the functions of pressurizing the jet and depressurizing the gutter for recover of the jet, for cooperating with integrated means for measuring viscosity, and for adding solvents when the ink used includes volatile solvents. A supply circuit of this type is described in French patent application 8316 440 filed by the applicant and published under the number 2 553 341. Such an architecture, although performing very well and adapted to certain applications, may have some drawbacks. Among others, gear pumps, even of small size, are not well adapted to generating small flow rates of medium pressure, such as those which are required in the continuous jet technique. This type of pump, by its construction, has internal leaks due to the necessary functional mechanical clearances: These leaks are such that the pump, in order to operate under good conditions, must generate a real flow rate very appreciably greater than that which is required for the jet. High flow rates at the pressures required involve mechanical and electric powers without any common measure with what is required for the jet, and so overheating, over dimensioned ventilation and electric supply.

Furthermore, the reliability of this type of pump, for this application, is very modest because materials compatible with light solvents (such as methyl ethyl ketone, are rare. The gears are often made from Teflon) which material has limited mechanical wear characteristics.

For the correct operation of such a circuit, it is necessary to use multiple sensors, such as pressure sensors, level sensors with immersed probes, viscosimeters, temperature sensors, for correcting the viscosity of the ink, considerable piping, etc. In addition, the cleaning procedures are tedious.

In another type of equipment, compressed air is used for pressurization. If it is industrial compressed air, it must be carefully filtered. The depression function for recovering the jet is obtained by a venturi effect. The major drawback of this supply system is the transfer of ink from the depressurized part to the pressurized part, which requires the provision of multiple transfer air locks. Furthermore, if compressed air is not available, a compressor is necessary.

OBJECTS OF THE INVENTION

The purpose of the present invention is to overcome or ameliorate the foregoing drawbacks.

SUMMARY OF THE INVENTION

The invention relates to a new device, called a cell in the rest of the description, which makes it possible to accomplish a larger number of functions, either alone or in combination with another function.

On the one hand, such a cell in cooperation with the different fluid, ink, and solvent reservoirs is capable of generating a fluid flow for supplying a conventional continuous ink jet printing head. On the other hand, such a cell is also capable of cooperating with means for recovering the ink jet not used (that is, for recycling it).

Finally, such a cell may be adapted for accomplishing, besides the functions already mentioned, the functions of measuring the viscosity of a fluid, of controlling the homogeneity of a fluid, of controlling the level of a fluid, etc.

Two of such cells in accordance with the invention may be adapted for forming a complete supply circuit which requires the use of a single motor and a single sensor. Thus an extremely compact architecture of means is obtained, which considerably opens the fields of application of the ink jet printing technique such as it is at present used in the industrial field, these application fields being possibly extended to office automation, for example.

The invention relates more precisely to a cell intended to be integrated in a hydraulic circuit, having a variable volume chamber, characterized in that the latter is variable volume chamber:

connected to a pressure sensor;

controlled by a stepper motor; and, finally connected to a plurality of valves each giving access to a restriction, the opening and closing of these valves being controlled electronically as a function of the position of the rotor of the motor and accepting both directions of operation. Such a combination of means make the cell capable of accomplishing multiple functions.

BRIEF DESCRIPTION OF THE DRAWINGS

The invention will be better understood from the following explanation and the accompanying Figures in which.

For the sake of clarity, the same elements bear the same references throughout the Figures.

DETAILED DESCRIPTION OF THE PRESENTLY PREFERRED EMBODIMENTS

Figure 1:
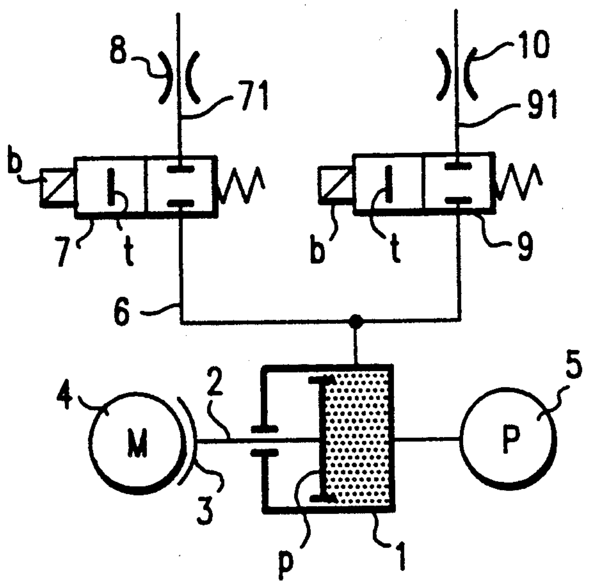
FIG. 1 illustrates schematically a cell of the invention controlled by stepper motor and equipped with a pressure sensor and "valve plus restriction" pairs.
Figure 2:
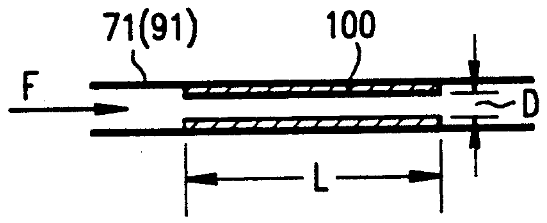
FIG. 2 illustrates schematically one embodiment of a local restriction of a hydraulic circuit intended to cooperate with a cell such as is illustrated in FIG. 1.

A cell in accordance with the invention is illustrated in FIG. 1. It is formed essentially of a chamber 1 the volume of which is variable as a function of the displacement of a piston p. The piston p is connected mechanically by means 2 to an excentric 3 driven by a stepper motor 4 whose operating mode of which will be explained further on. The stepping motor contains a rotor (not illustrated). The chamber 1 is connected on the one hand to a pressure sensor 5 and on the other hand through at least one piping 6 to one, two, or more valves electrically controlled by coils b. Only a first valve 7 and a second valve 9 have been shown in FIG. 1, but this number is not restrictive, and the application described further on will moreover clearly show the use of more than two valves associated with a single chamber. The valves 7 and 9 accept both directions of flow of the fluid and are normally closed (as shown in FIG. 1) in the absence of an electric signal. The position of a spool t shows for example that the first valve 7 is in the blocking position. Finally, in an outlet pipe 71, 91 from each valve 7, 9 a restriction 8, 10 is normally provided the structure of which is clearly shown in FIG. 2. The restrictions 8, 10 are designed so as to create a pressure difference at their ends when a flow of fluid with non zero viscosity passes through them, which may result in a pressure drop. The restrictions 8, 10 are in particular capable of showing, through a difference of pressure ($\Delta P$), the viscosity of the fluid at the time of a fluid flow pulse. For this, as shown in FIG. 2, the restrictions 8, 10 are formed from a tube 100 integrated in series in the hydraulic circuit, of a length L appreciably greater than the inside diameter D of the tube 100. By way of example, the length L may be equal to about 15 times the inside diameter D of the tube 100 through which the fluid transits, the arrow F symbolizing the flow. This tube section of length L and inside diameter D corresponds then to the restriction such as symbolized in FIG. 1 by references 8 and 10 and by other references in subsequent Figures.

Figure 3A:
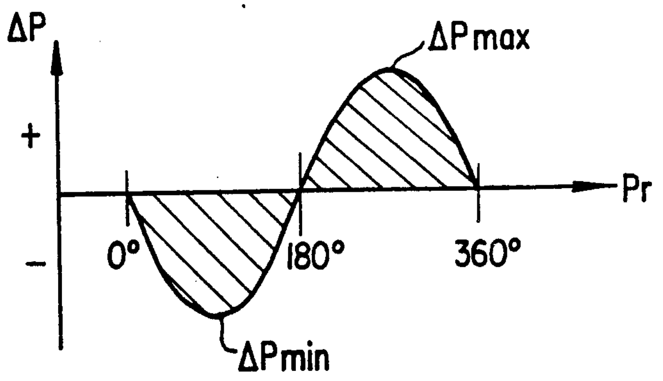
FIG. 3*a* illustrates schematically a pressure diagram of the cell in the operating configuration illustrated in FIG. 3*b;*

In FIG. 3*a* a pressure diagram is shown illustrating the variation $\Delta P$ as a function of the position Pr, for a complete revolution (from 0° to 360°) of the rotor of the stepper motor 4. This diagram corresponds to the configuration of the chamber 1 illustrated in FIG. 3*b* where the electrically controlled valve 7 is permanently open. The electrically controlled valve 9, always closed, is shown with dotted lines. By convention, in the rest of the description, the position 0° corresponds to the position Pr of the rotor of the stepper motor 4 where the volume of the chamber 1 is minimum and 180° the position where the volume of the chamber 1 is maximum. The displacement of piston p is illustrated by the arrows F1 and F2. This displacement causes a corresponding movement of the viscous fluid in the restriction 8 the direction of which depends on that of the piston p, whence its representation by arrow F3 and an arrow F4.

Displacement of the piston p in the variable volume chamber 1 generates a displacement of fluid through the valve 7 and the restriction 8. The displacement of the viscous fluid through the restriction 8 causes, at the pressure sensor 5, the appearance of a pressure difference $\Delta P$ (FIG. 3*a*) which is positive or negative depending on the direction of displacement of the piston p. The instantaneous value of this pressure depends both on the instantaneous flow rate of the fluid and on its viscosity. At the time of an increase in volume of the chamber (suction), $\Delta P$ is negative, and, at the time of a decrease in volume (delivery), $\Delta P$ is positive.

The diagram shown in FIG. 3*a* represents the evolution of the pressure measured at the pressure sensor 5 for a complete rotation from 0° to 360° of the stepper motor 4, and this at a constant speed of rotation. The mechanical coupling between the rotor and the stepping motor 4 and the piston p is provided by the eccentric 3, which is symmetrical (that is, the shape of the suction curve in FIG. 3A is symmetrical to the shape of the delivery curve).

Figure 4A:
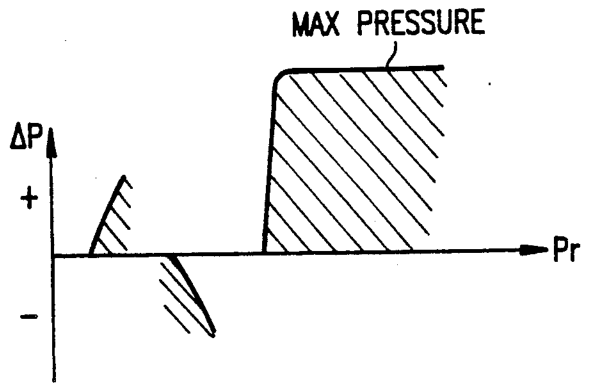
FIGS. 4*a*, 4*b*, and 4*c* illustrates schematically pressure diagrams of a cell of the invention in its function leading to the determination of the positioning of the rotor of the motor.

Under these conditions, with a cell of the invention a sensor for detecting the position Pr of the rotor is no longer required, which position Pr it is, however, essential to determine so as to be able to synchronize the operation of the valves. For that, the pressure diagrams will be used in the way described hereafter. The fluid and the pressure sensor 5 are used for determining the angular 0° of the stepper the rotor of motor 4, namely Pr=0°. The nature of the fluid present in the chamber 1 is determined first of all. To do this, the two valves 7 and 9 are closed. The rotor of the stepper motor 4 is moved a few steps in one direction, and a few steps in the other so as to determine the compression direction and the expansion direction. The rotor is then moved continually in the direction in which the pressure increases. This procedure is illustrated in FIG. 4*a*, which shows the evolution of the pressure difference ΔP as a function of the advance of the rotor step by step, in one direction first of all then in the other, and finally in the direction corresponding to compression.

If the pressure reaches the maximum measurable by the pressure sensor 5, the fluid is an incompressible and viscous fluid (for example, ink) and it is impossible in this way to determine the maximum compression point which corresponds to the angular position Pr=0° corresponding to the minimum value of chamber 1.

Figure 4B:
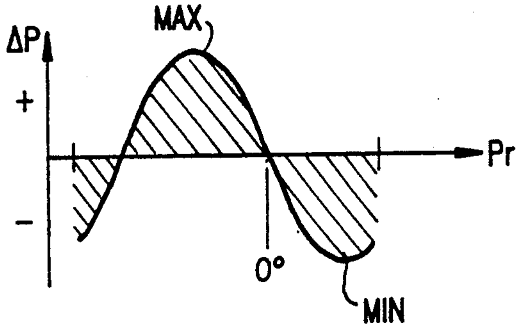

To get over that, one of the valves is opened and the rotor makes a complete revolution (FIG. 4*b*). Then the differential pressure ΔP is measured, which is created by the restriction 8 or 10 corresponding to the open valve 7 or 9. The angular position Pr=0° is then determined by the medium position situated between the maximum (maxi) and the minimum (mini) of ΔP, such as shown in FIG. 4*b*.

Figure 4C:
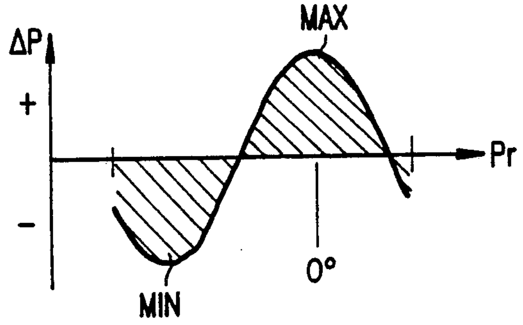

If, on the other hand, when the two valves 7 and 9 are closed the maximum pressure difference ΔP measurable by the pressure sensor 5 is not reached, the fluid is compressible. It is then, in the example chosen, a mixture of air and ink. In this case, with the valves 7 and 9 remaining closed, a complete revolution of the rotor is made, and the angular position Pr=0° is determined by the maximum point of ΔP such as shown in FIG. 4*c*.

In accordance with the invention, by using such a process, it is no longer necessary to use a specific sensor with the role of indicating the angular position of the rotor of the motor 4. Knowing this position, by this means, the synchronization of the valves 7 and 9 may then be insured. This is one of the function of a cell of the invention.

Figure 5:
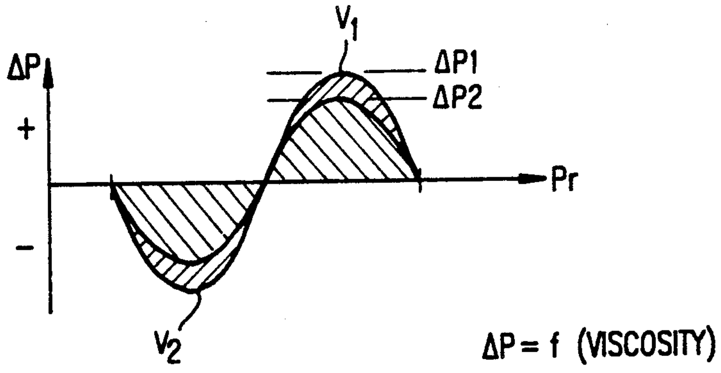
FIG. 5 illustrates schematically a variation of the pressure diagram of the cell for different viscosities of the fluids used.

In accordance with another characteristic of the invention, knowing the function ΔP=f viscosity, the value of the viscosity of the fluid may be derived, for a known and fixed value of the restriction concerned and a known and fixed value of the speed of rotation of the stepper motor 4, from the maximum values of the pressure differences (ΔP maxi and ΔP mini) corresponding to the maximum instantaneous flow generated by the piston p. This other function of the chamber 1 is illustrated in FIG. 5, which shows the two diagrams ΔP=f(Pr) for two different viscosity V1 and V2 of the fluid.

The functions of measuring the position Pr of the rotor of the stepper motor 4 and that of measuring the viscosity of the fluid having been described, the operation of the cell will now be described, in accordance with another characteristic of the invention, in its function for generating a fluid flow, the cell then behaving as a veritable pumping cell.

Figure 3B:
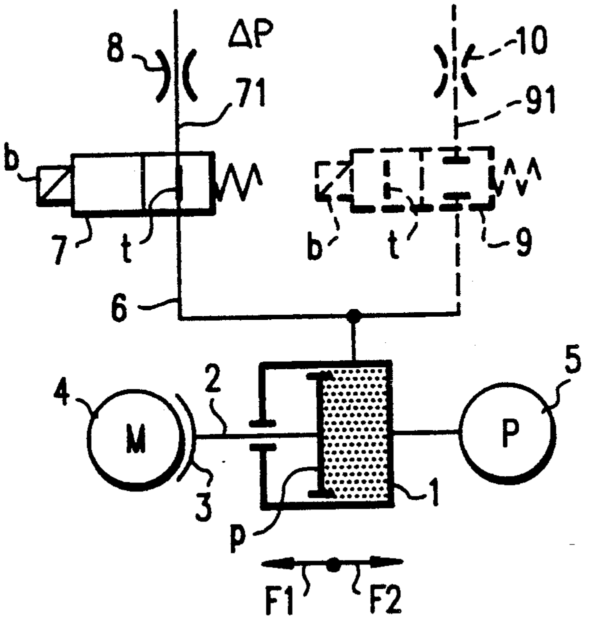
Figure 6A:
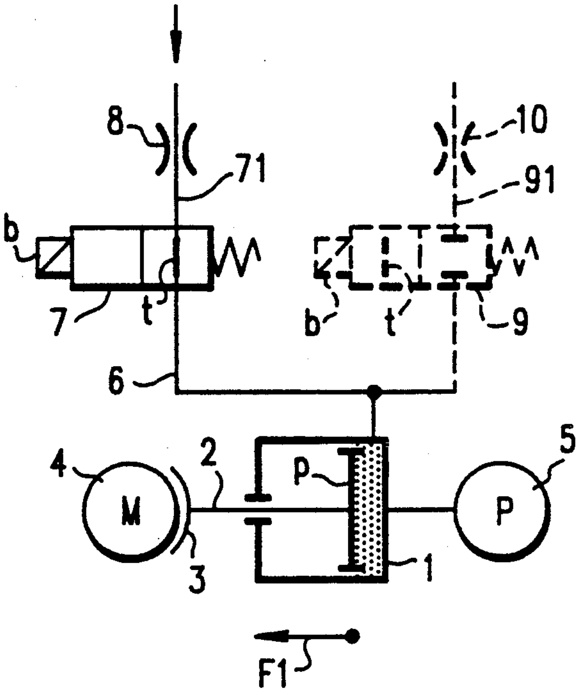
FIGS. 6*a* and 6*b* show schematically the state of the valves, respectively open and closed, corresponding to the suction and delivery cycles.
Figure 6B:
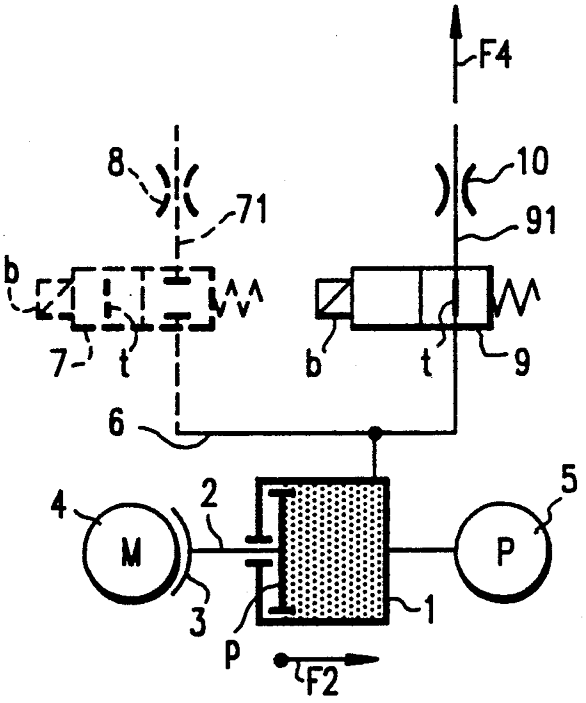
Figure 7:
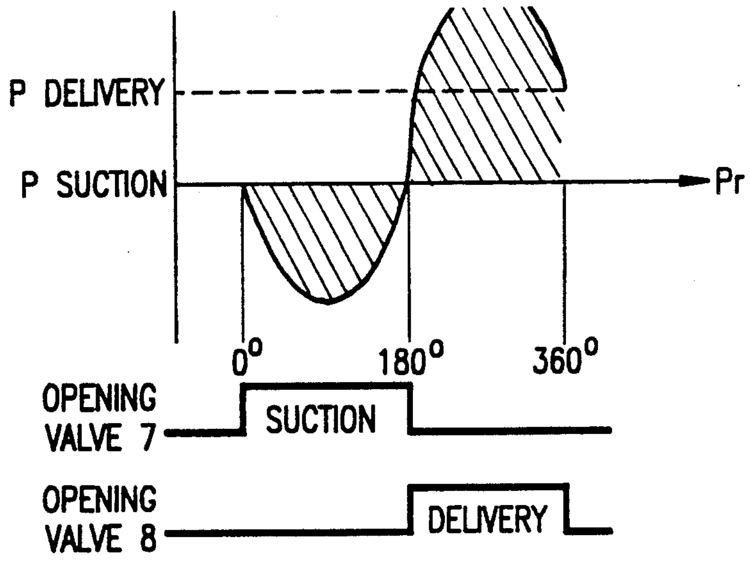
FIG. 7 illustrates schematically these suction and delivery cycles.

The generation of a fluid flow takes place in two half cycles. The first one (FIG. 6*a*) consists in causing the valve 7 to open during the half revolution of the stepper motor 4 from the position Pr=0° to the position Pr=180°—that is to say, the time during which the volume of the chamber 1 increases (arrow F1) and the fluid is sucked (arrow F3). The second half cycle (FIG. 6*b*) consists in causing the valve 9 to open during the following half revolution of the motor from Pr=180° to the Pr=360°—that is to say, the time during which the volume of the chamber decreases and the fluid is delivered (arrow F2). FIG. 7 shows the pressure difference ΔP measured by the pressure sensor 5 during the two half cycles explained above and which corresponds to a suction phase following opening of the valve 7 and a delivery phase corresponding to opening of the valve 9. Under these conditions, a fluid flow may be generated in both directions by reversing the operation of the valves 7 and 9 or else may not be, if one of the two valves is kept open and the other closed while the stepper motor 4 rotates, as is illustrated in FIG. 3*b*. These two particular operating modes, characteristic of the invention, are essential for the application described herebelow. In addition, it is possible to add other valve-restriction pairs to the same variable volume chamber, so as to create a multi-input/multi-output pumping system, such as will be explained in the embodiment of the supply circuit of the invention described hereafter.

Among the other functions which the cell of the invention may provided, we may mention the emptying of a pressurized reservoir for the benefit more particularly of another reservoir. For that it is sufficient to open simultaneously the two valves associated respectively with these two reservoirs.

Furthermore, the configuration of a circuit comprising a cell of the invention makes possible the direct measurement of a pressure by means of the pressure sensor 5 by placing the chamber 1 in direct relation with the member the pressure of which it is desired to measure. The valve 7, 9 which controls this member situated downstream is then kept in the open position, the stepper motor 4 is stopped and the pressure sensor 5 is then directly in communication, through the chamber 1, with the member, not shown here, but an example of which will be given subsequently.

Figure 8:
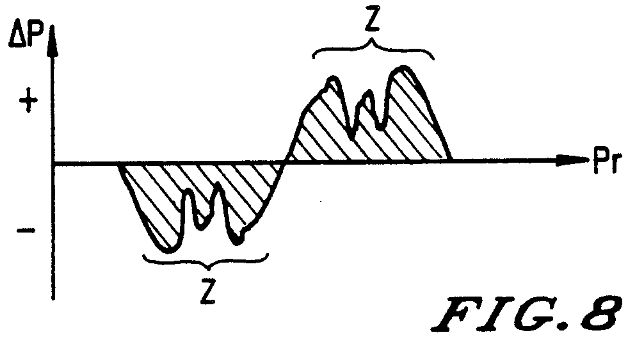
FIG. 8 illustrates schematically the pressure diagram in the case where the fluid is not homogeneous.

If the transported fluid includes several phases, the pressure diagram is not as is shown in FIG. 7, but as is illustrated in FIG. 8. Clearly visible zones of disturbances Z appear in the diagram ΔP=f(Pr) and are the image of the viscosity variation of a two phase fluid (for example: ink plus air). This is an additional function which a cell of the invention may accomplish—namely, the detection of homogeneity defects of the transported fluid. Thus the presence of air bubbles may, for example, be detected in the conveyed ink. The profile shown in FIG. 8 is only one example, knowing that any profile of the diagram departing from a sinusoid, if all of the other parameters are correct, reveals a multiphase fluid.

The operation of a cell in accordance with the invention, it should be noted, differs from the conventional operation of a membrane pump with non return valves. In fact, the valves of a conventional membrane pump are here replaced, in accordance with the invention, by the bidirectional valves 7 and 9 controlled in synchronism with the absolute position of the rotor of the stepper motor 4 by an appropriate electronic system. Such an arrangement leads to obtaining all the functions which the cell thus described may accomplish.

Having now described the basic multi-function cell of the invention, in its main operating modes, an application of such cells will now be described adapted so that, in combination with ink and solvent reservoirs, the cells form an original hydraulic supply circuit capable, on the one hand, of supplying a continuous ink jet printing head with ink and, on the other hand, of recovering the ink not used for printing, which ink is collected in a recovery gutter.

Figure 10A:
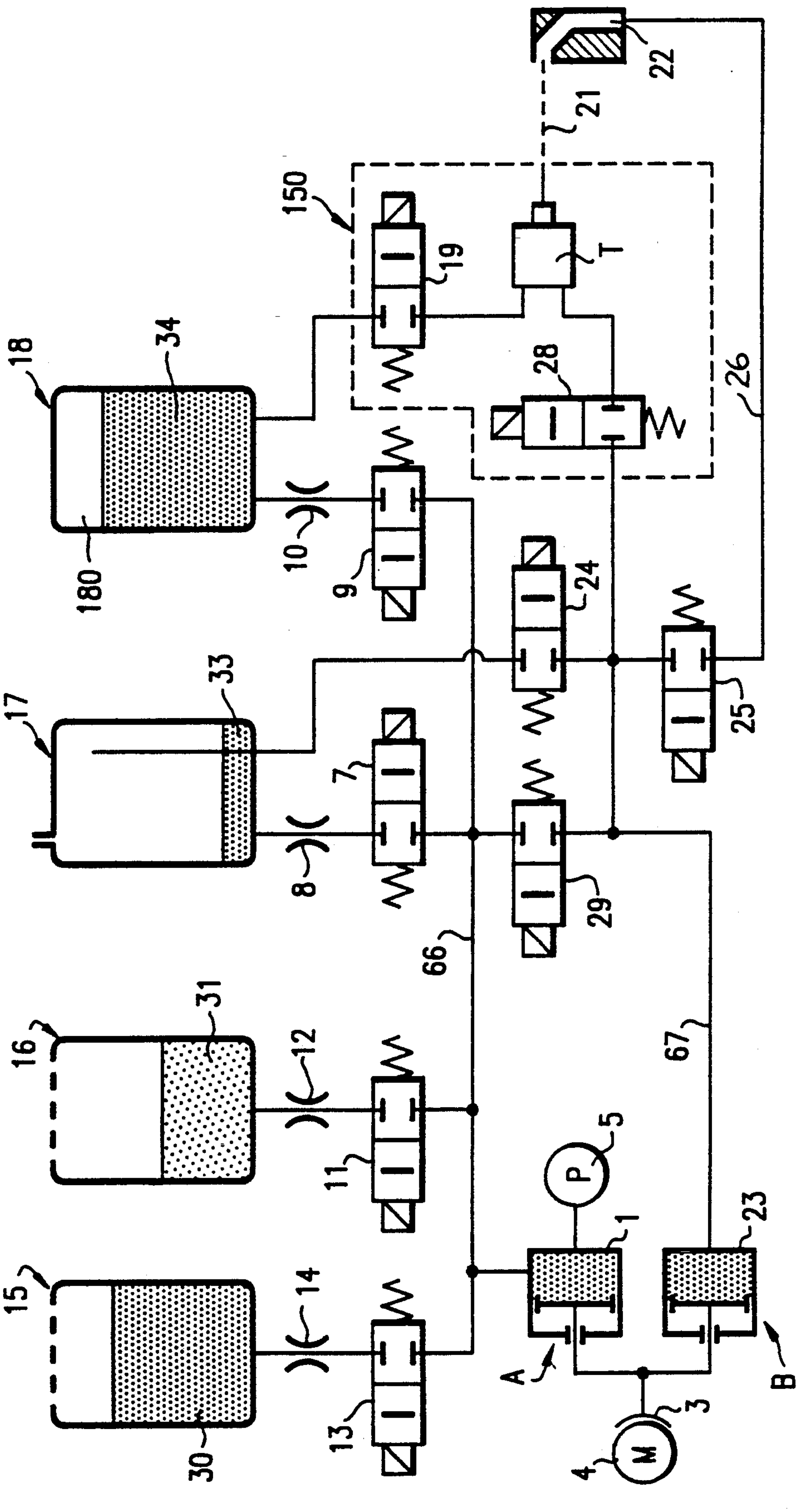
FIG. 10*a* illustrates schematically a first embodiment of an ink supply circuit for a printing head using two cells in accordance with the invention in a static position (that is to say, stopped)

Such a circuit in accordance with the invention is illustrated in FIG. 10*a* in a static configuration, all the valves being in the closed position. This circuit includes four reservoirs, two of which are removable.

A reservoir 15 is a cartridge containing a quantity of reserve ink 30, not yet used. The reservoir 15 is removable.

A reservoir 16 is a cartridge containing a quantity of pure solvent 31 for the ink used. The pure solvent 31 makes it possible to top up the solvent required so as to maintain the viscosity of the ink used and recycled in the system. Maintenance of the viscosity of the ink of the jet is related to evaporation of the solvent during recycling of the ink. The reservoir 16 is also removable.

A reservoir 18 containing a quantity of ink 34 functionally fulfills the role of a pressure accumulator which is used for the purpose of transforming the pulsed flow of the cell, when it is used as a pump cell, into a constant fixed pressure flow, intended directly for forming the jet. The reservoir 18 therefore contains a pressurized air pocket 180 which plays the role of damper. The pressurized air pocket 180 is renewed whenever the printer is started up, as will be explained further on.

The purpose of a reservoir 17 is to receive a quantity of recovered ink 33 and air returning from a gutter 22 and to separate them. The ink required for maintaining the pressure in the reservoir 18 is taken from the reservoir 17. The reservoir has a volume equivalent to reservoir 18, for reasons explained further on.

Each of the four reservoirs 15, 16, 17, 18 is connected, in accordance with the invention, by a general duct 66 to the first variable volume chamber 1 through a valve-restriction pair 9–10 for the reservoir 18; 7–8 for the reservoir 17; 11–12 for the reservoir 16; and 13–14 for the reservoir 15. All these restrictions, as has already been mentioned, are of the type shown in FIG. 2. The assembly of these cells, the heart of which is the chamber 1, bears the general reference A.

The pressure sensor 5 is connected to the first chamber 1 and makes possible a whole series of controls and measurements corresponding to the functions described above and which are explained hereafter in the application considered. One of the characteristics of this supply circuit is that it only has a single sensor, the pressure sensor 5, and the single pressure sensor 5 makes possible all the measurements required for the correct operation of the assembly, namely, measurement of the pressure of the ink feeding the jet, measurement of the viscosity of the ink, control of the level of the reservoir 18 during regeneration of the pressurized air pocket 180, measurement of the level of the recovered ink 33 in the reservoir 17, measurement of the low level and of the empty level of the pure solvents in the reservoir 16, measurement of the viscosity of the reserve ink in the reservoir 15 (which parameter is related more particularly to the temperature) measurement of the low level and of the empty level of the reserve ink in the reservoir 15, synchronization of the operation of the valves with the position Pr of the rotor of the stepper motor 4. As can be seen, and as it should again be emphasized, this single pressure sensor 5 alone replaces all the sensors which are necessarily required in supply circuits of presently known types.

A variable volume chamber 23 also cooperates with a plurality of valves; this combination is referenced B. Its essential purpose is to recover the ink of a jet 21 that falls into the gutter 22. The second chamber 23 is in fact combined with a set of three valves 29, 24, 25 the functions of which will be explained further on. The second cell does not comprise any restrictions to the extent that, since it is coupled mechanically to the eccentric 3 common to the first chamber 1, synchronism of the operation of the valves 24, 25, 29 which are associated therewith follows from the synchronism of the chamber 1. Such a combination of two assemblies A and B in accordance with the invention, coupled then to the single stepping motor 4 and to a single pressure sensor 5, further contributes to the compactness of the circuit. At A is shown the cell corresponding to the assembly including the chamber 1, more especially related to the supply of a printing head T, and B the cell corresponding to the assembly including the chamber 23 which controls recovery of the ink from the gutter 22. The gutter 22 is connected to the valve 25 through a duct 26, the valve 25 being itself connected to a general piping 67 of the assembly B. The valve 29 serves for coupling between the general duct 66 and the general piping 67, whereas the valve 24 is connected both to the reservoir 17 and to the general piping 67.

The functions of a valve 19 and of a valve 28 are related directly to the operation of the jet 21 emitted by the printing head T and form part of the known art, particularly from the patent application of the applicant already mentioned above.

For that, this combination is fictitiously isolated from the rest of the circuit by means of a broken line rectangle 150. It should be noted that the valve 19 is respectively connected to the pressurized reservoir 18 and to the printing head T which generates the ink jet 21. The valve 28, called the drain valve, is connected to the valves 24, 25, 29 of the cell B. The unused portion of the ink jet 21 is recovered from a recovery gutter 22.

The operation of the supply circuit of the invention is now described for the main phases during which the cells of the invention accomplish their multiple functions already described above.

Figure 9:
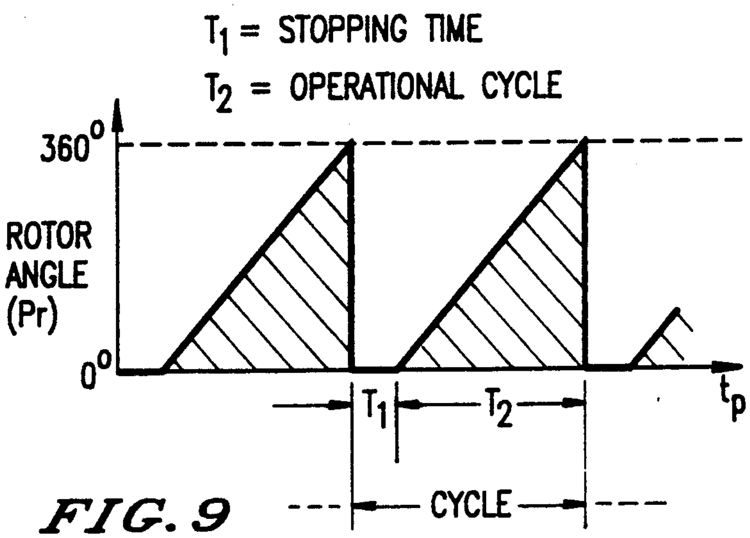
FIG. 9 is a diagram illustrating the position of the rotor of the motor actuating the variable volume chamber, as a function of time, in an application to the ink jet.

It should be noted previously that, in all cases, except when it is stated to the contrary, the stepping motor 4 rotates cyclically at a constant speed—which means that the variable volume chambers 1 and 23, which are coupled together, each generate its volume cyclically. This rotational cycle T1 plus T2 presents, at each revolution, a stop for a time T1 required for measuring a static pressure, a pressure measurement not influenced by the differential pressures induced by flows in the restrictions 8, 10, 12, and 14. This time allowed makes it possible to measure the static pressures of the reserve ink 30 in the reservoir 15, of the pure solvent 31 in the reservoir 16, and of the pressurized ink 34 in the reservoir 18. The usefulness of these measurements will be explained further on. The corresponding diagram illustrating the evolution of position Pr of the rotor as a function of time tp is shown in FIG. 9.

The essential operating cycles are then effected by electrically controlling the different valves synchronously at the instantaneous position Pr of the rotor of the stepping motor 4, as was explained above.

For the ease of understanding, a succession of FIGS. 10*b* to 10*i* has been shown each corresponding to the situation in which the different valves concerned find themselves for a given operation phase. Those which are open (passage of the fluid) for the sequence considered are shown with continuous lines, those which are closed (blocking of the fluid) for the sequence considered are shown with dotted lines. When the valve considered is held permanently open (passing), the whole of the coil b is shaded and the spool t shown with a continuous line. When the valve is successively opened and closed at each half cycle, the coil b is half shaded and the spool t is shown with dark dotted lines. All the valves not concerned in the operating phase described are therefore shown with light dots.

During operation of the printer, the valve 19 is open, the printing head T is supplied and the jet 21 emitted. Such a representation makes it possible to see at a glance the path followed by the fluid between the different elements of the circuit and particularly the transfer of ink and solvent from one reservoir to another, the supply of the printing head T and the recovery of the unused ink from the gutter 22 to the reservoir 17.

Each of these principle functions will now be described in greater detail in connection with FIGS. 10*b* to 10*i*:

(a) Maintenance of the pressure of the reservoir 18 during operation of the jet 21 (FIG. 10*b*):

When the valve 19 is open and the jet 21 is present, the volume of the ink 34 in the reservoir 18, which is subjected to the pressure of the pressurized air pocket 180 which it contains, decreases in time, during flow of the jet 21, which increases the volume of the pressurized air pocket 180 and results in a pressure drop. Maintenance of the pressure, and so of the volume of ink 34 contained in the reservoir 18 is provided by adding a dose of ink to the reservoir 18 coming from the reservoir 17, this is accomplished through the combination 1, 7, 9, which is caused to operate as a pumping cell, as was explained above particularly with reference to FIG. 6*a* and 6*b*. When reference is made to a dose in the description, it refers to the volume corresponding to that which is generated by the piston P in the chamber 1 with, for this sequence, the help of the valves 7 and 9.

In order to be able to maintain the pressure in the reservoir 18, it is necessary to monitor it. This is done periodically during the stopping time T1 of the rotor of the stepping motor 4, by means of the pressure sensor 5. Obviously, this period of measurement is less than that for regenerating ink in the reservoir 18. In other words, the successive measurements of the static pressure of the reservoir 18 are made at a frequency greater than that of the ink doses which are required for maintaining the pressure in the reservoir 18 (flow of the jet 21).

(b) Measurement of the viscosity of the ink feeding the jet 21 and adjustment of this viscosity as a function of a given reference (FIGS. 10*c*, 10*d* and 10*e*):

Keeping the operating parameters constant in time is of prime importance for ensuring high printing quality. The viscosity of the ink must then be regularly monitored so as to be corrected by adding solvent if it is higher than a reference the value of which is determined in a way described further on.

Figure 10B:
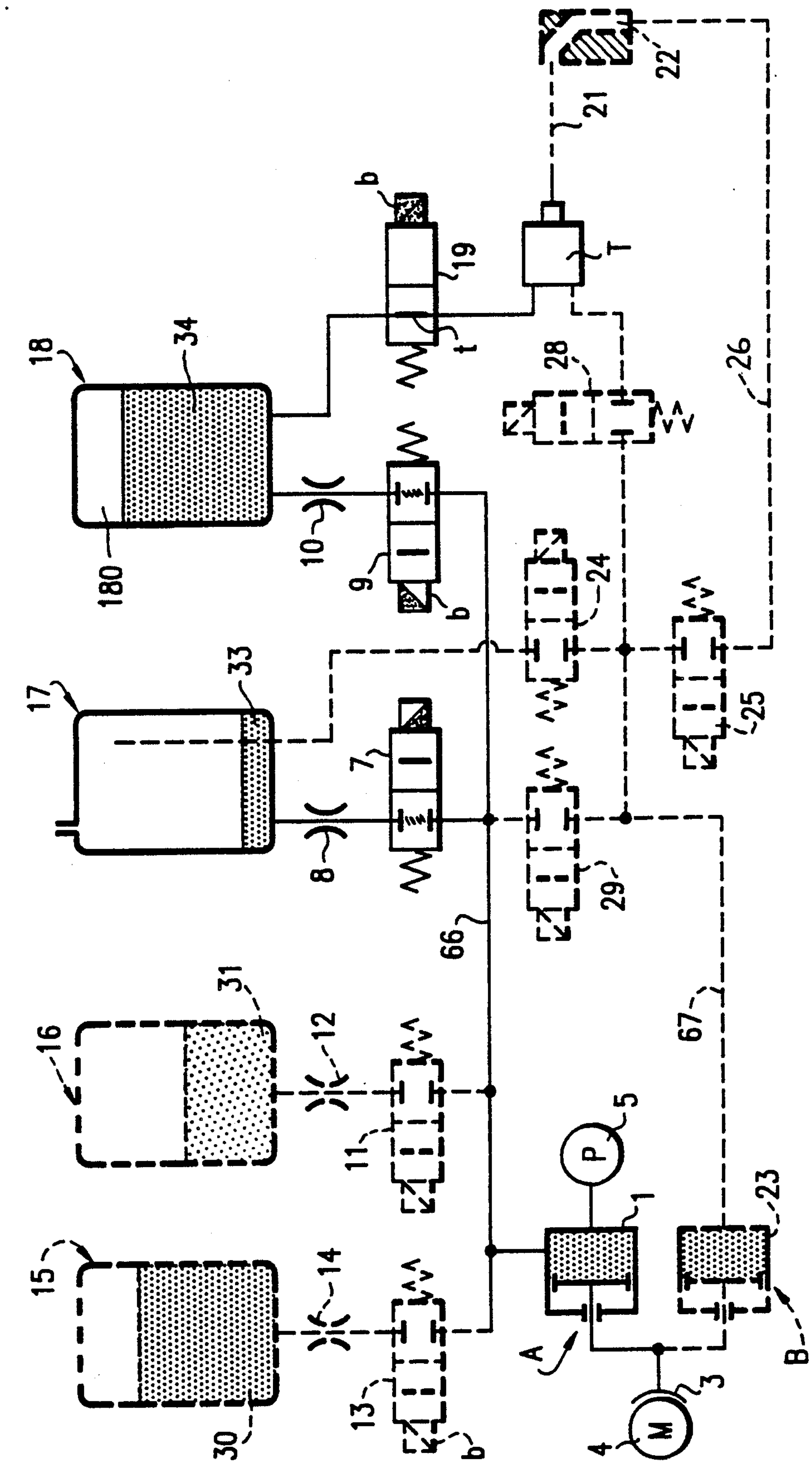
FIGS. 10*b* to 10*i* each illustrate schematically the position occupied by the different elements of the circuit such as described with reference to FIG. 10*a*, respectively for each of the main functions inherent in the correct operation of the circuit.
Figure 10C:
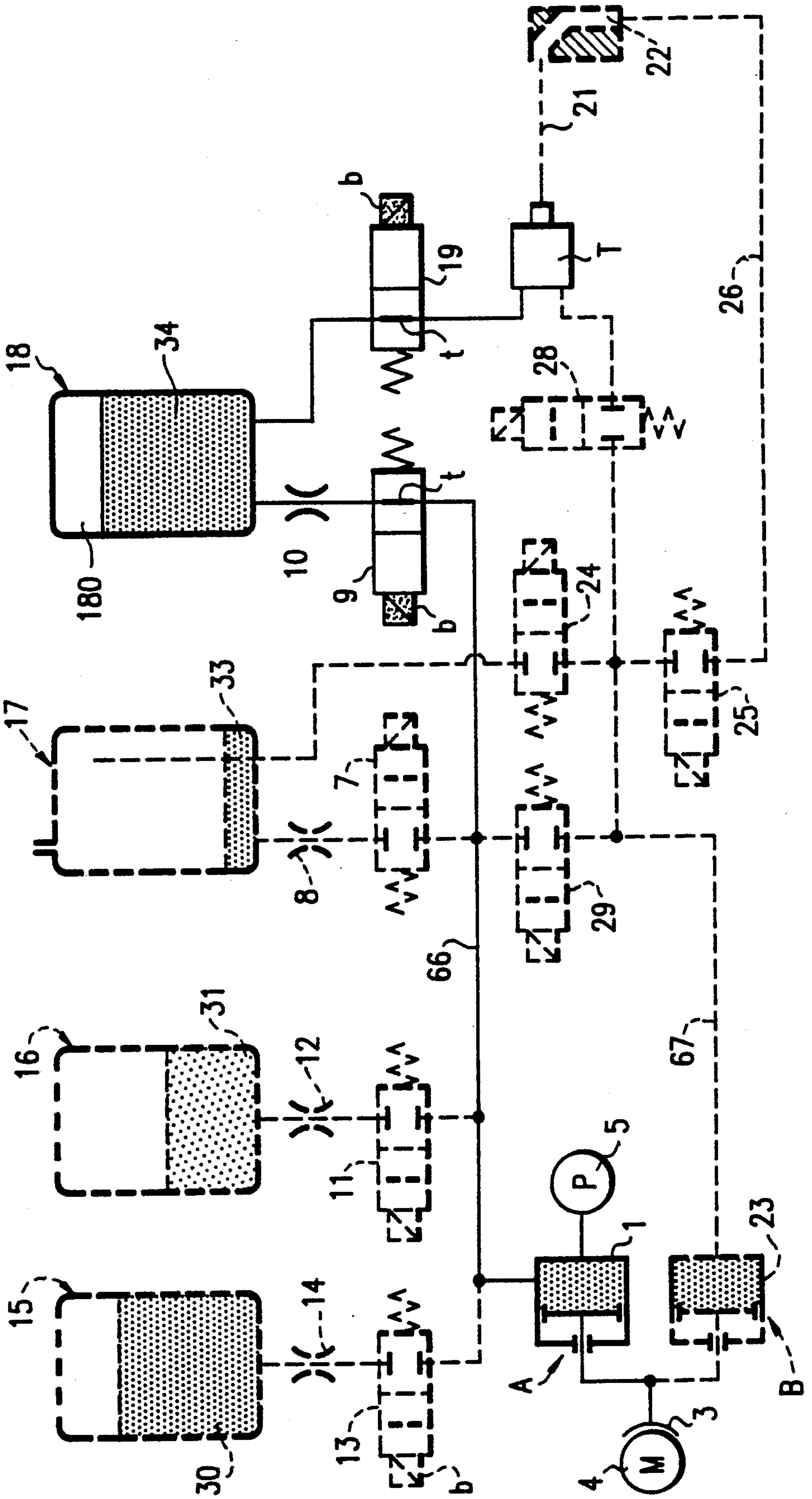

The viscosity of the ink 34 is checked regularly using a complete cycle of rotation of the rotor while leaving the valve 9 open, as shown in FIG. 10*c*. The differential pressure ΔP makes possible the measurement of the viscosity of the ink 34. The viscosity measurement cycle takes place when no addition of ink is required in the reservoir 18.

This cycle makes it possible also to homogenize the ink 34 in the reservoir 18 when it has just received a dose of solvent, by alternately stirring the ink. Thus, when solvent has just been added to the reservoir 18, as will be explained further on, the cycle is repeated several times before serving for measuring the viscosity.

Figure 10D:
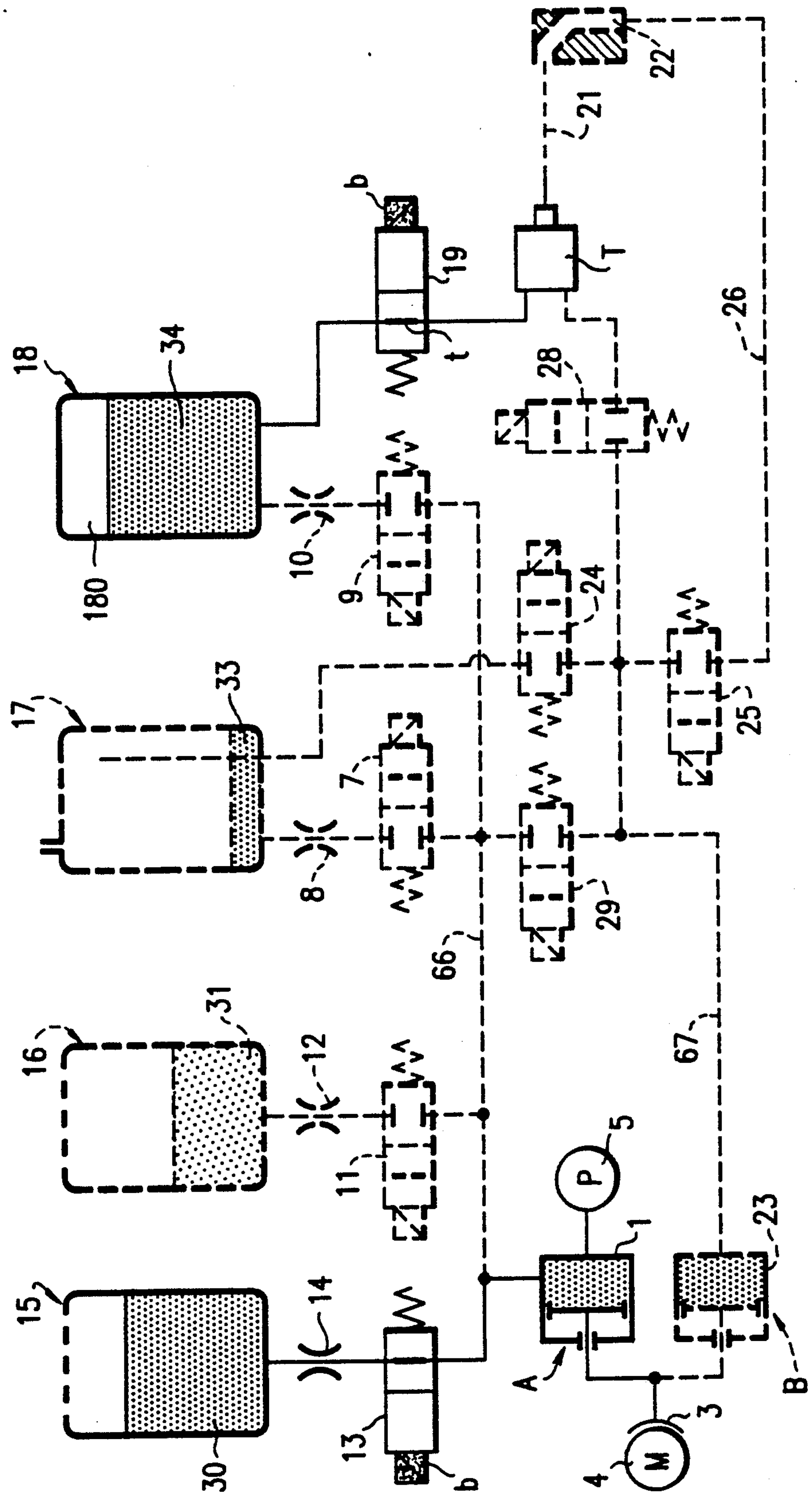

The viscosity of the ink used, apart from any evaporation of solvent, depends on the temperature. Therefore the viscosity reference must take into account the variation of viscosity of the ink as a function of the temperature. For this, the viscosity reference of the ink used is fixed by measuring the viscosity of the reserve ink 30 in the reservoir 15. This measurement is achieved by measuring the differential pressure ΔP during a cycle of the rotor when the valve 13 remains permanently open (FIG. 10*d*). Thus are overcome the constraints associated with the use of different types of ink which have different properties as a function of the temperature.

Figure 10E:
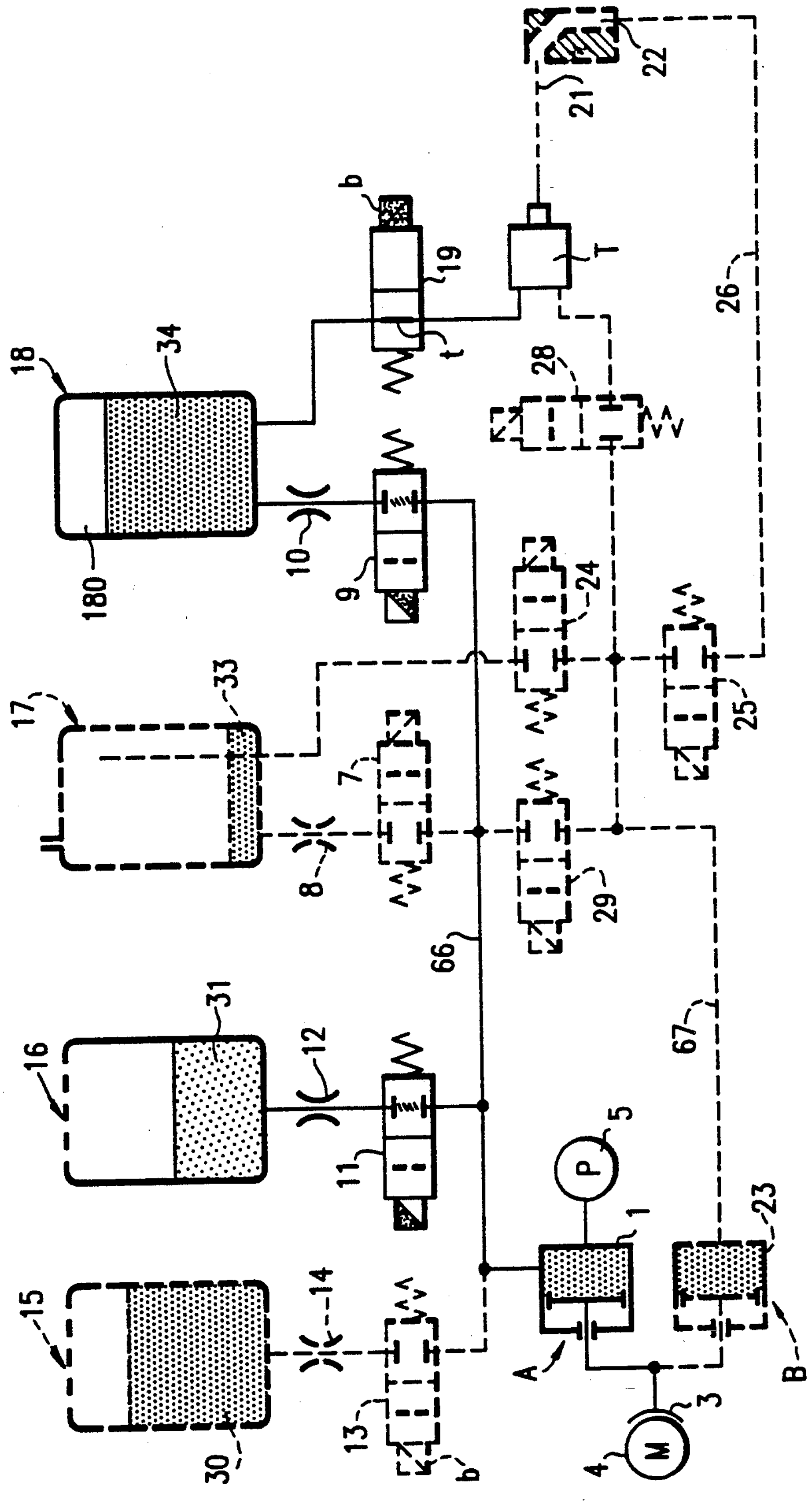
Figure 10F:
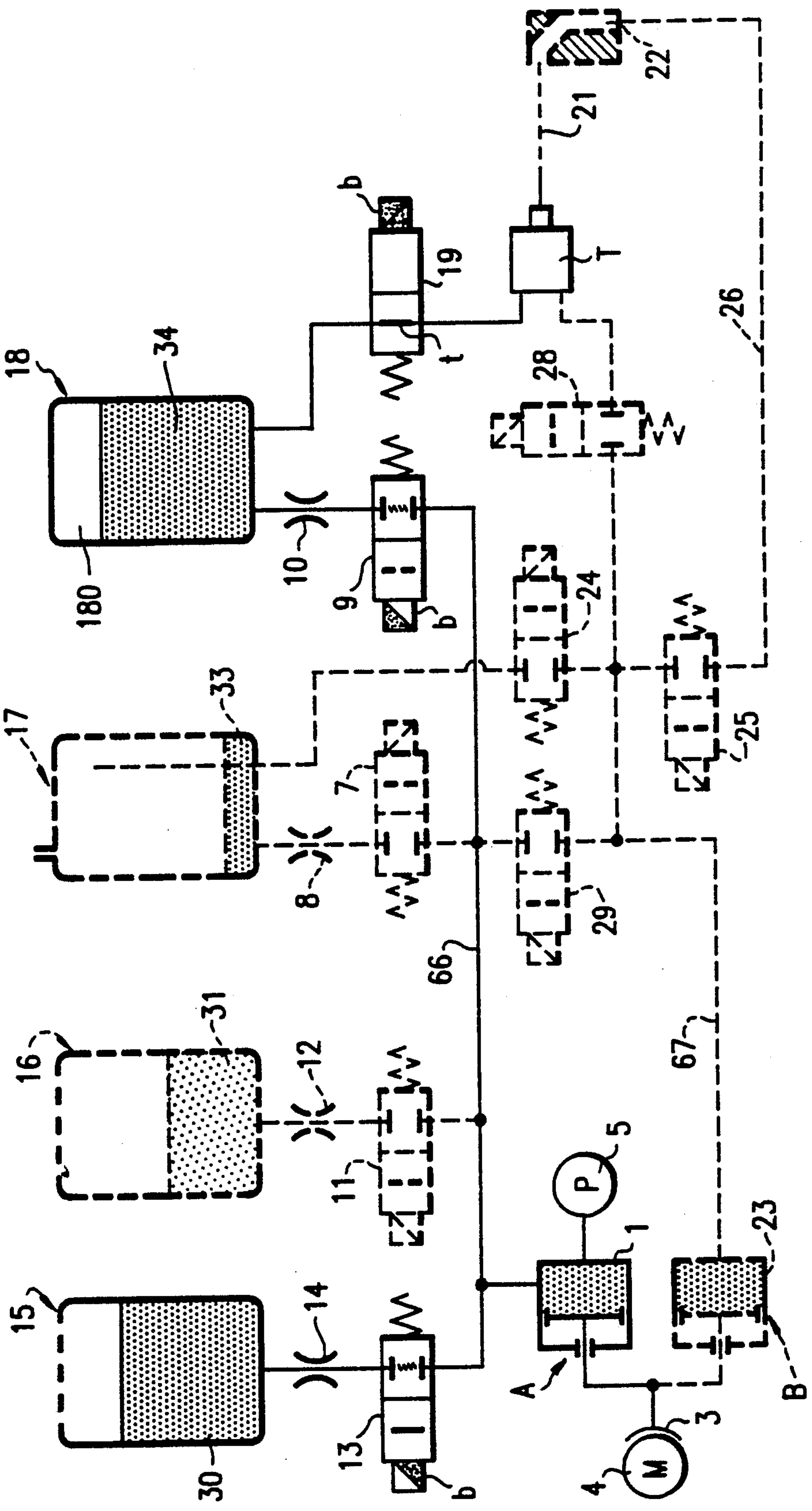
Figure 10G:
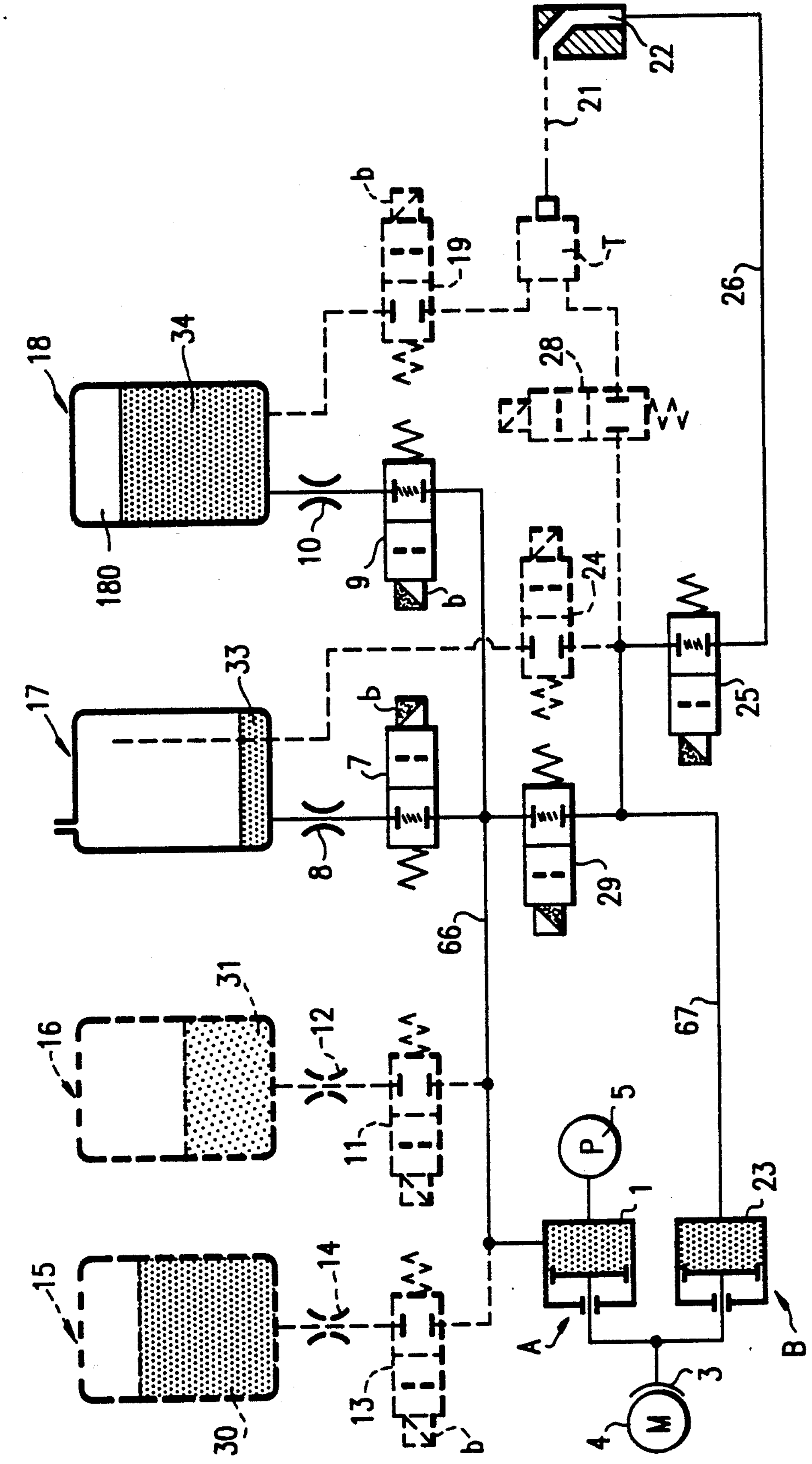
Figure 10H:
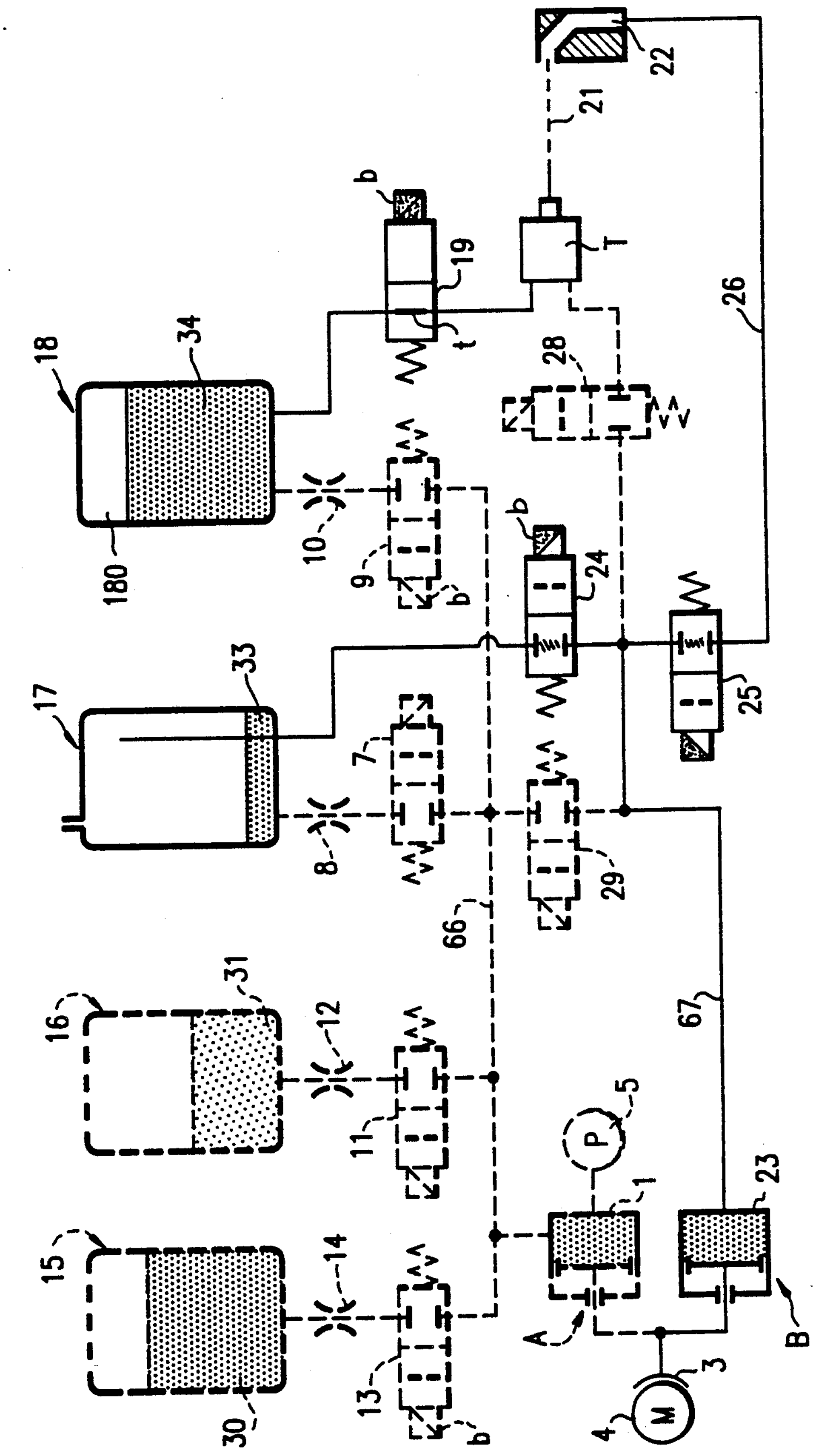
Figure 10I:
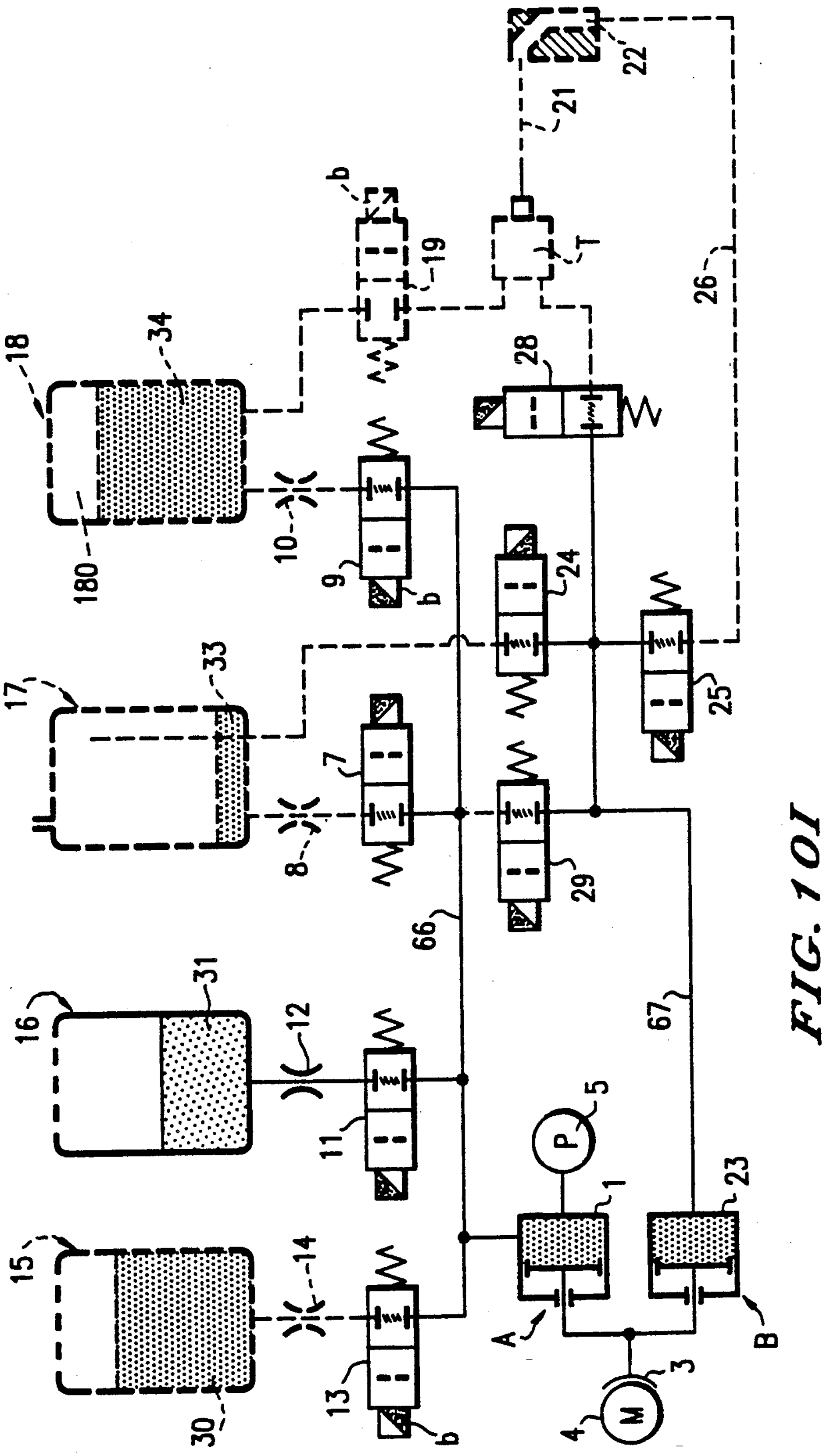

When the viscosity of the ink contained in the reservoir 18 is considered too high, a dose of the pure solvent 31 from the reservoir 16 is fed into the reservoir 18. For this, as shown in FIG. 10*e*, the two valves 11 and 9 are opened and the cell A by means of 1, 11, 9 operates as a pumping cell, as shown in FIG. 10*e*.

(c) Measurement of the level in the reservoir 17 and addition of ink to the reservoir 18 (FIG. 10*f*):

When addition of ink is required in the reservoir-accumulator 18, the ink is drawn from the reservoir 17. The two valves 7 and 9 are opened and operate with the chamber 1 as a pumping cell (FIG. 10*b*). If, during this addition, an intake of air is detected (i.e., if the reservoir 17 is empty) in the form of a defect of the differential pressure diagram appearing at the terminals of the restriction 8, such as was explained above and illustrated in FIG. 8 during the suction half cycle, then the delivery half cycle is carried out by keeping the valve 7 open instead of opening the valve 9 so as to push the air back into the reservoir 17. In the next cycle, with no addition of ink made and the pressure in the reservoir 18 continuing to remain too low, a new addition of ink is carried out, but this time from the reservoir 15, using consecutively the valves 13 and 9 operating with the chamber 1 as a pumping cell, as is shown schematically in FIG. 10*f*.

(d) Measurement of the low and empty levels of the reservoirs 15 and 16:

The removable ink and solvent the reservoirs 15 and 16 are each formed of a flexible envelope containing the reserve ink 30 and the pure solvent 31, respectively. This flexible envelope is protected by a rigid case.

The flexible envelope containing the liquid (ink or solvent) has the characteristic, because of its form, of being all the less deformable the lower the remaining volume of liquid. This results in the appearance of a depression of liquid in the pressurized air pockets all the higher the smaller the volume of liquid remaining.

During a cycle for taking the reservoir ink 30 or the pure solvent 31, the static pressure in the pressurized air pocket 180 concerned is measured by keeping the corresponding valve 13 or 11 open during the time T1 during which the rotor is stopped (FIG. 9). The liquid level in the deformable pressurized air pockets is considered low when the depression measured is less than a given reference.

An attempt at taking liquid from the reservoirs 15 and 16, when the corresponding pressurized air pockets are empty, results in an absence of flow through the restrictions 14 and 12. This absence of flow appears on the pressure diagram obtained by a zero differential pressure (flat diagram), which indicates the empty level of the reservoirs. An important remark to be made is that, in the case of an empty cartridge, a zero differential pressure due to a nonexistent flow is associated with a static pressure under high depression with respect to the surrounding pressure whereas, in the absence of a cartridge, a zero differential pressure is associated with a static pressure equal to the surrounding pressure.

(e) Maintaining the pressurized air pocket 180 at the pressure required for operation of the reservoir 18 (FIG. 10*g*):

So that the reservoir-pressure accumulator 18 can play its role correctly, it is necessary to guarantee a minimum volume of air therein. The free air contained in the reservoir 18 is always subject to slow but certain dissolution in the ink 34, and it is therefore necessary, so as to maintain the efficiency of the pressure accumulator function of the reservoir 18, to regularly restore this volume of air. This is made possible by emptying the reservoir of ink, by allowing the outside air to enter into the reservoir 18 if it is under depression (as the result of a "lack of air" by dissolution in the ink during operation), and by filling the reservoir 18 with ink again up to the operating pressure of the jet 21, this series of operations being carried out before each start up of the jet 21.

This is done in the following way. With the reservoir 18 under pressure, it is in a first step emptied of its ink by opening both the valves 7 and 9 simultaneously, with the stepping motor 4 stopped, the pressurized air driving the ink 34 into the reservoir 17 faster than would a cell operating as a pumping cell the flow rate of which is of the same order as that of the jet 21. The pressure recorded during this emptying is the medium pressure between the pressure in the reservoir 18 and the surrounding pressure. As soon as the pressure measured by the pressure sensor 5 is practically equal to the surrounding pressure, the stepping motor 4 is again used for creating a pumping function, the valve 9 being open during the suction half cycle and the valve 7 being open during the delivery half cycle.

This reversed operation is carried out until there is no liquid flow through the restriction 10, which means that the reservoir 18 is completely empty. The volume of ink sucked in by the pumping cell has placed the reservoir 18 under depression. The ink 34 initially present in the reservoir 18 is then contained entirely in the reservoir 17.

The valves 9, 29, and 25 are then opened so as to allow the outside air coming from the gutter 22 to regenerate the volume of air in the reservoir 18.

The last operation consists in taking up again the ink contained in the reservoir 17 and placing it again under the pressure of the volume of regenerated air in the reservoir 18. This is accomplished by causing the pumping cell to operate, the valve 7 being open during the suction half cycle and the valve 9 being open during the delivery half cycle.

During the low pressure emptying and filling phases of the reservoir 18, in order to increased the flow rate, the chamber 23 is preferably coupled to the chamber 1 through the valve 29 which is kept permanently open and which serves in this case for coupling between the two chambers 1 and 23.

(f) Suction of the jet 21 by the gutter 22 (FIG. 10*h*):

Suction of the ink jet 21 by the gutter 22 is possible by using the cell including the valves 25, 24 associated with the chamber 23 operating as a pumping cell, the chamber 23 being coupled, as was mentioned above, to the motor 4. The air-ink mixture recovered from the gutter 22 through the duct 26 is fed back to the reservoir 17.

(g) Automatic short stop procedure (FIG. 10*i*):

One of the problems raised by printers using inks with volatile solvents is the drying of the ink, the dry resins of which often foul up the elements having relatively moving mechanical parts. The valves in particular are the first involved. An ink circuit of the invention overcomes this problem, for it makes it possible to fill all the valves with solvent before stopping of the machine. Accordingly, even if the solvent dries, the valves will not be stuck, for the solvent has no sticky resins. Such cleaning by using solvent is achieved very simply in as many motor cycles as there are valves to be filled, by taking for each of them, during the suction half cycle with the valve 11 open, a dose of the pure solvent 31 from the reservoir 16 and injecting it into the valve concerned, which is then opened.

This is done for the valves 13, 7, and 9, as well as for the valves 24 and 25, these latter being filled while simultaneously opening the valve 29.

(h) Automatic procedure for complete cleaning, long stop, or ink change:

The first phase consists in transferring the ink completely from the reservoir 17 to the reservoir 18 by operating the cell 7, 1, and 9. The second phase consists in letting the ink contained under pressure in the reservoir 18 to escape through the gutter 22 by opening the valve 9, 29, and 25 and pumping the remaining ink, if any, through, cell 9, 29, 25 by means of the two coupled chambers 1 and 23. The third phase consists in transferring the pure solvent 31 pressure in the reservoir 18 is taken from the contained in the reservoir 16 into the reservoir 17 and then into the reservoir 18. This pressurized solvent is then expelled into the gutter 22 after having rinsed the nozzle body of the printing head T (i.e., the valves 19, 28, 25). All these operations provide completely automatic rinsing of the assembly of the supply circuit. It is sufficient to correctly control the different valves and to cause the cell groups A and B to operate as pumps.

Figure 10J:
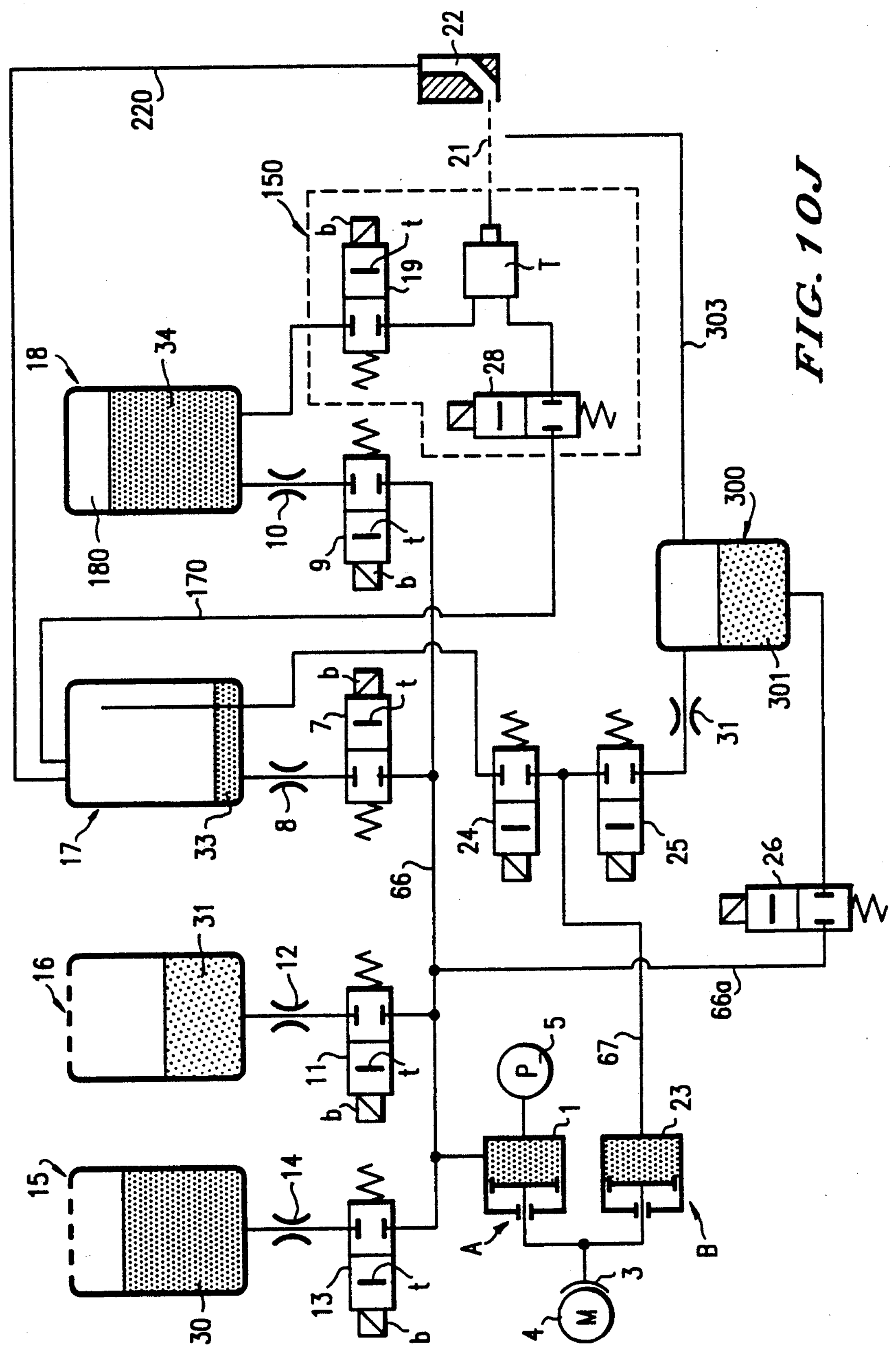
FIG. 10*j* illustrates schematically another embodiment of an ink supply circuit for a printing head in accordance with the present invention, in the static position.
Figure 10K:
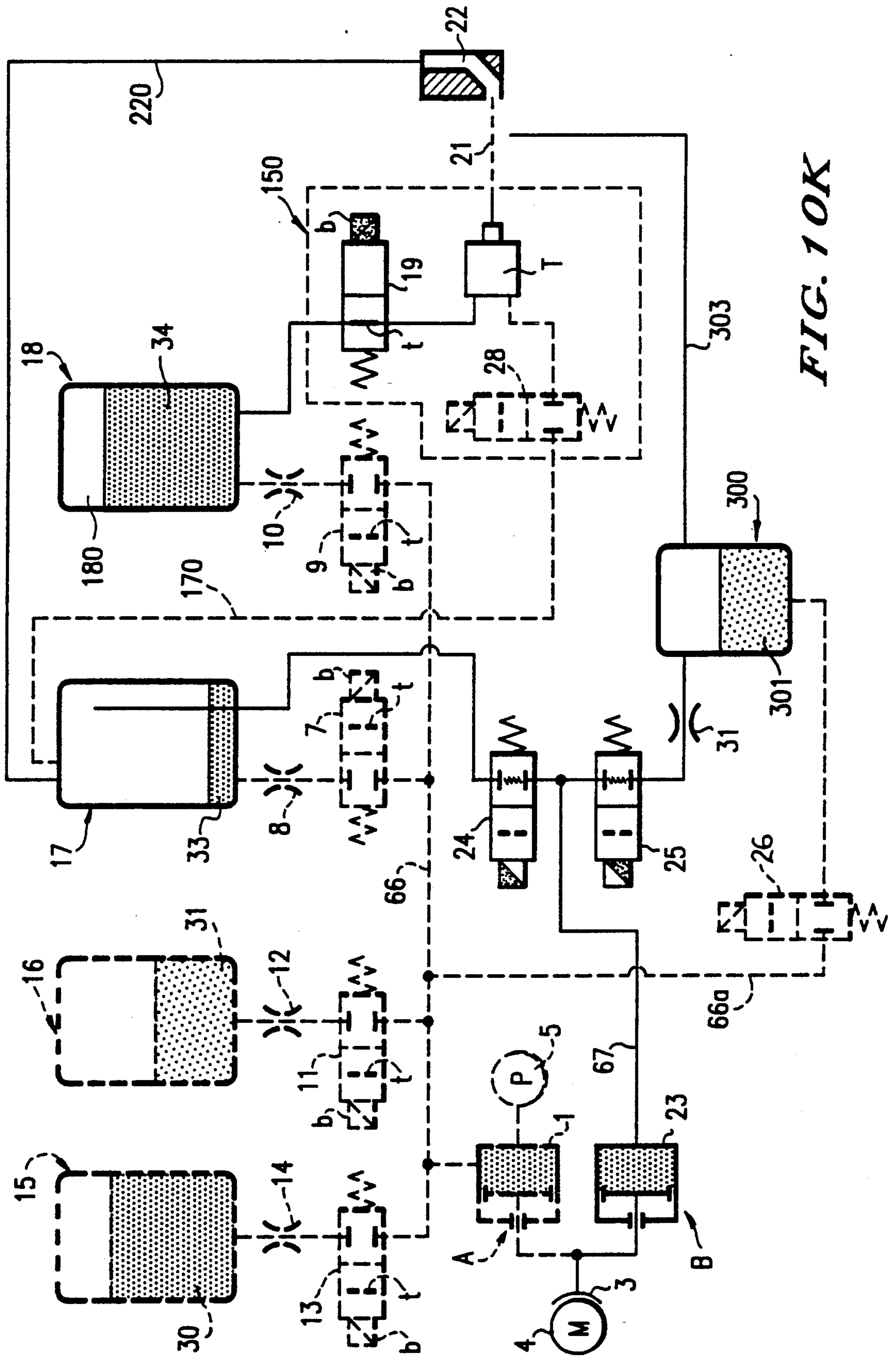
FIGS. 10*k* and 10*m* illustrate each of the positions occupied by the different elements of the circuit such as is described with reference to FIG. 10*j.*
Figure 10M:
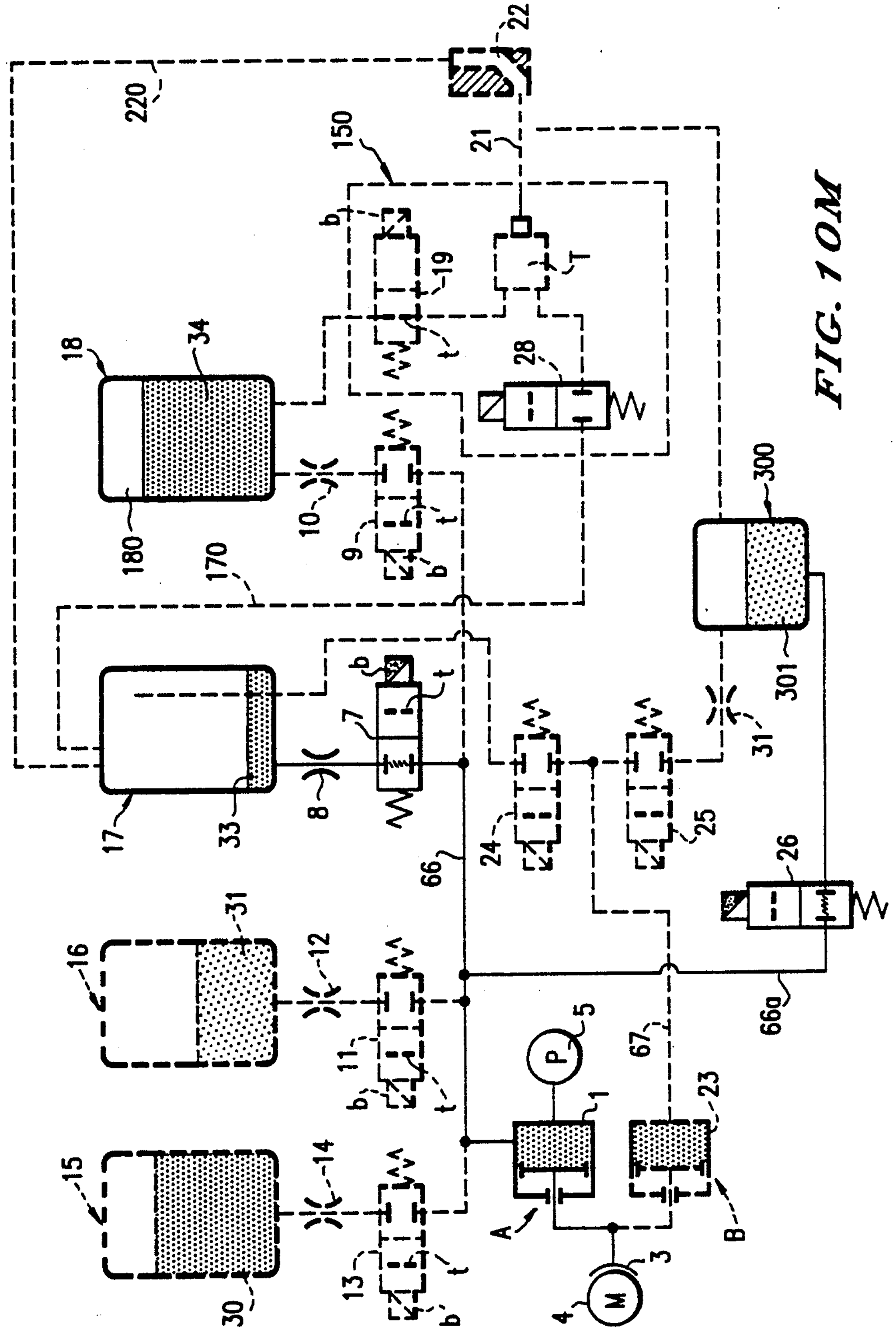

Another embodiment of the supply circuit of the invention is illustrated in FIGS. 10*j*, 10*k* and 10*m*. As can be seen in FIG. 10*j*, which is a static representation of the circuit, this latter includes four reservoirs of which two are removable. The reservoir 15 is a cartridge containing the reserve ink 30, not yet used. The reservoir 15 is removable. The 16 is a cartridge containing the pure solvent 31 for the ink used. The pure solvent 31 makes it possible to top up the solvent required for maintaining the viscosity of the ink used and recycled in the system. Maintenance of the viscosity of the ink of the jet is related to evaporation of the solvent during recycling of the ink. The reservoir 16 is also removable.

The reservoir 18 containing the ink 34 functionally fulfills the role of a pressure accumulator which is used for transforming the pulsed flow of the cell, when it is used as a pumping cell, into a constant flow at a fixed pressure and intended directly for forming the jet. The reservoir 18 for this purpose, contains the pressurized air pocket 180 which plays the role of damper. The pressurized air pocket 180 is renewed at each start up of the printer.

The purpose of the 17 is to receive the recovered ink 33 and air returning from the gutter 22 and separating them. The ink required for maintaining the pressure in the reservoir 18 is taken from this reservoir.

Each of the four reservoirs 15, 16, 17, 18 is connected, in accordance with the invention, by the general duct 66 to the first variable volume chamber 1 through a valve-restriction pair 9–10 for the reservoir 18; 7–8 for the reservoir 17; 11–12 for the reservoir 16; and 13–14 for the reservoir 15. The assembly of these cells, the heart of which is the chamber 1 bears the general reference A.

The second variable volume chamber 23 also cooperates with a plurality of valves. This combination is reference B.

The second chamber 23 is combined with a set consisting of the two valves 24, 25. The second cell does not comprise any restriction, being coupled mechanically to the eccentric 3 common to the first chamber 1, synchronism of the valves which are associated therewith follows from the synchronism of the first chamber 1. Such a combination of two assemblies A and B in accordance with the invention coupled then to the single stepping motor 4 and to a single pressure sensor 5, contributes to the compactness of the circuit. As before, the cell corresponding to the assembly including the chamber 1, more especially related to the supply of the printing head T, is referenced B, and the cell corresponding to the assembly including the chamber 23 is referenced B.

In this configuration, the assembly B only sucks in air, which results in substantially reducing the torques at the level of the piston. This is contrary to the preceding variant, where the assembly B sucked in a two phase fluid.

A characteristic of this circuit also consists in connecting the reservoir 17, called a buffer reservoir by means of a duct 220 directly to the recovery gutter 22 and in placing the reservoir 17 under a depression, thus transforming it into a veritable depression accumulator. This improvement avoids pulsed pumping at the level of the gutter 22 of a twin phase fluid, which would risk causing ink splashes at the level of the gutter 22. In addition, a valve 27 is connected on one side to the general duct 66 and on the other to a condenser 300 having a container for a quantity of condensate 301 and a discharge 303 for volatile products. The condenser 300 is also connected to the valve 25 through a restriction 32.

FIGS. 10*k* and 10*m* illustrate the circuit portions and the valves concerned. Those which are concerned in the function, for the sequence considered, are shown with continuous lines, and the others are shown with dotted lines. When the valve considered is maintained in a constant state (open), the whole of the coil b is shaded and the spool t is shown with broken lines. When the valve is successively opened and closed at each half cycle, the coil b is half shaded and the spool t is shown schematically with dark dotted lines.

Only the two steps have been shown corresponding, on the one hand for FIG. 10*k* to the depressurization of the reservoir 17 ensuring recovery of the ink from the gutter, 22, via the duct 220, and on the other hand for FIG. 10*m* to pumping of the condensate 301 for feeding it into the reservoir 17. In fact, the other functions are substantially identical to those already described, but they are taken up here again for the sake of clarity.

(a) Maintenance of the pressure of the reservoir 18 during operation of the jet 21:

When the valve 19 is open and the jet 21 is present, the volume of the ink 34 in the reservoir 18, which is subjected to the pressure of the pressurized air pocket 180 which it contains, decreases in time, during flow of the jet 21, which increases the volume of the pressurized air pocket 180 and results in a pressure drop. Maintenance of the pressure, and so of the volume of ink 34 contained in the reservoir 18 is provided by adding a dose of ink to the reservoir 18 coming from the reservoir 17. This is accomplished through the combination 1, 7, 9, which is caused to operate as a pumping cell, as was explained above particularly with reference to FIGS. 6*a* and 6*b*. When reference is made to a dose in the description, it refers to the volume corresponding to that which is generated by the P in the chamber 1 with, for this sequence, the help of the valves 7 and 9.

In order to be able to maintain the pressure in the reservoir 18, it is necessary to monitor it. This is done periodically during the stopping time T1 of the rotor of the stepping motor 4, by means of the pressure sensor 5. Obviously, this period of measurement is less than that for regenerating ink in the reservoir 18. In other words, the successive measurements of the static pressure of the reservoir 18 are made at a frequency greater than that of the ink doses which are required for maintaining the pressure in the reservoir 18 (flow of the jet 21).

(b) Measurement of the viscosity of the ink feeding the jet 21 and adjustment of this viscosity as a function of a given reference Keeping the operating parameters constant in time is of prime importance for ensuring high printing quality. The viscosity of the ink must then be regularly monitored so as to be corrected by adding solvent if it is higher than a reference the value of which is determined in a way described further on.

The viscosity of the ink 34 is checked regularly using a complete cycle of rotation of the rotor while leaving the valve 9 open. The differential pressure $\Delta P$ makes possible the measurement of the viscosity of the ink 34. The viscosity measurement cycle takes place when no addition of ink is required in the reservoir 18.

This cycle makes it possible also to homogenize the ink 34 in the reservoir 18 when it has just received a dose of solvent, by alternately stirring the ink. Thus, when solvent has just been added to the reservoir 18, as will be explained further on, the cycle is repeated several times before serving for measuring the viscosity.

The viscosity of the ink used, apart from any evaporation of solvent, depends on the temperature. Therefore the viscosity reference must take into account the variation of viscosity of the ink as a function of the temperature. For this, the viscosity reference of the ink used is fixed by measuring the viscosity of the reserve ink 30 in the reservoir 15. This measurement is achieved by measuring the differential pressure $\Delta P$ during a cycle of the rotor when the valve 13 remains permanently open. Thus are overcome the constraints associated with the use of different types of ink which have different properties as a function of the temperature.

When the viscosity of the ink contained in the reservoir 18 is considered too high, a dose of the pure solvent 31 from the reservoir 16 is fed into the reservoir 18. For this, the two valves 11 and 9 are opened and the cell A by means of 1, 11, 9 operates as a pumping cell.

(c) Measurement of the level in the reservoir 17 and addition of ink to the reservoir 18:

When addition of ink is required in the reservoir-accumulator 18, the ink is drawn from the reservoir 17. The two valves 7 and 9 are opened and operate with the chamber 1 as a pumping cell. If, during this addition, an intake of air is detected (i.e., if the reservoir 17 is empty) in the form of a defect of the differential pressure diagram appearing at the terminals of the restriction 8 during the suction half cycle, then the delivery half cycle is carried out by keeping the valve 7 open instead of opening the valve 9 so as to push the air back into the reservoir 17. In the next cycle, with no addition of ink made and the pressure in the reservoir 18 controlling to remain too low, a new addition of ink is carried out, but this time from the reservoir 15, using consecutively the valves 13 and 9 operating with the chamber 1 as a pumping cell.

(d) Measurement of the low and empty levels of the reservoirs 15 and 16:

The removable ink and solvent reservoirs 15 and 16 are each formed of a flexible envelope containing the reserve ink 30 and the pure solvent 31, respectively. This flexible envelope is protected by a rigid case.

The flexible envelope containing the liquid (ink or solvent) has the characteristic, because of its form, of being all the less deformable the lower the remaining volume of liquid. This results in the appearance of a depression of liquid in the pressurized air pockets all the higher the smaller the volume of liquid remaining.

During a cycle for taking the reserve ink 30 the pure or solvent 31, the static pressure in the pressurized air pocket 180 concerned is measured by keeping the corresponding valve 13 or 11 open during the time T1 during which the rotor is stopped. The liquid level in the deformable pressurized air pockets is considered low when the depression measured is less than a given reference.

An attempt at taking liquid from the reservoirs 15 and 16, when the corresponding pressurized pockets are empty, results in an absence of flow through the restrictions 14 and 12. This absence of flow appears on the pressure diagram obtained by a zero differential pressure (flat diagram), which indicates the empty level of the reservoirs. An important remark to be made is that, in the case of an empty cartridge, a zero differential pressure due to a nonexistent flow is associated with a static pressure under high depression with respect to the surrounding pressure whereas, in the absence of a cartridge, a zero differential pressure is associated with a static pressure equal to the surrounding pressure.

(e) Suction of the jet 21 by the gutter 22 (FIG. 10*k*):

As shown in FIG. 10*k*, the air is pumped into the reservoir 17 through the valves 24, 25 connected by the general piping 67 to the chamber 23, which results in depressurizing the reservoir 17. The reservoir 17 then plays the role of depression accumulator. The duct 220 connects the depressurized reservoir 17 to the gutter 22 so that the ink jet 21 is directly recovered, from the gutter 22, via the duct 220.

As has already been mentioned, such a configuration avoids the risk of splashes, at the level of the gutter 22, which may result from pulsed pumping of a twin phase fluid, ink plus air.

(f) Suction of the condensate and recovery thereof in the reservoir 17 (FIG. 10*m*):

The air being pumped into the reservoir 17 may take with it a not inconsiderable amount of solvent. This is why the whole passes through a condenser 300 in which the solvent is deposited in the form of the condensate 301, the air being discharged through the discharge 303 the orifice of which is brought as close as possible to the gutter 22 so that, if there still remain traces of volatile products, the pollution of the environment is reduced as much as possible.

The condensate 301 is reinjected into the reservoir 17 by actuating the valves 27, 7, coupled to the chamber 1 through a duct 66*a* and the general duct 66.

(g) Maintaining the pressurized air pocket 180 at the pressure required for operation of the reservoir 18:

So that the reservoir-pressure accumulator 18 plays its role correctly, it is necessary to guarantee a minimum volume of air therein. The free air contained in the reservoir 18 is always subject to slow but certain dissolution in the ink 34, and it is therefore necessary, so as to maintain the efficiency of the pressure accumulator function of the reservoir 18, to regularly restore this volume of air. This is made possible by emptying the reservoir of ink, by allowing the outside air to enter into the reservoir 18 if it is under depression as the (result of a "lack of air" by dissolution in the ink during operation), and by filling the reservoir 18 with ink again up to the operating pressure of the jet 21 this series of operations being carried out before each start up of the jet 21.

This is done in the following way. With the reservoir 18 under pressure, it is in a first step empties of its ink by opening both the valves 7 and 9 simultaneously, with the stepping motor 4 stopped, the pressurized air driving the ink 34 into the reservoir 17 faster than would a cell operating as a pumping cell the flow rate of which is of the same order as that of the jet 21. The pressure recorded during this emptying is the medium pressure between the pressure in the reservoir 18 and the surrounding pressure. As soon as the pressure measured by the pressure sensor 5 is practically equal to the surrounding pressure, the stepping motor 4 is again used for creating a pumping function, the valve 9 being open during the suction half cycle and the valve 7 being open during the delivery half cycle.

This reversed operation is carried out until there is no liquid flow through the restriction 10, which means that the reservoir 18 is completely empty. The volume of ink sucked in by the pumping cell has placed the reservoir 18 under depression. The ink 34 initially present in the reservoir 18 is then contained entirely in the reservoir 17.

The valves 9, 27 are then opened so as to allow the outside air to enter freely in the reservoir 18.

The last operation consists in taking up again the ink contained in the reservoir 17 and placing it again under the pressure of the volume of regenerated air in the reservoir 18. This is accomplished by causing the pumping cell to operate, the valve 7 being open during the suction half cycle and the valve 9 being closed during the delivery half cycle.

(h) Automatic short stop procedure

One of the problems raised by printers using inks with volatile solvents is the drying of the ink, the dry resins of which often foul up the elements having relatively moving mechanical parts. The valves in particular are the first involved. An ink circuit of the invention overcomes this problem, for it makes it possible to fill all the valves with solvent before stopping of the machine. Accordingly, even if the solvent dries, the valves will not be stuck, for the solvent has no sticky resins. Such cleaning by using solvent is achieved very simply in as many motor cycles as there are valves to be filled, by taking for each of them, during the suction half cycle with the valve 11 open, a dose of the pure solvent 31 from the reservoir 16 and injecting it into the valve concerned, which is then opened.

This is done for the valves 13, 7, 9, and 27, as well as for the valves 24 and 25, for which the solvent is drawn from the condenser 300.

(i) Automatic procedure for complete cleaning, long stop, or ink change:

The first phase consists in transferring the ink completely from the reservoir 17 to the reservoir 18 by operating the cell 7, 1, and 9. The second phase consists in letting the ink contained under pressure in the reservoir 18 to escape through the gutter 22 and pumping the remaining ink, if any, through the valves 9, and 27 by means of the chamber 1. The third phase consists in transferring the pure solvent 31 contained in the reservoir 16 into the reservoir 17 and then into the reservoir 18. This pressurized solvent is then expelled into the gutter 22 after having rinsed the nozzle body of the printing head T. All these operations provide completely automatic rinsing of the assembly of the supply circuit. It is sufficient to correctly control the different valves and to cause the cell groups A and B to operate as pumps.

In a non limitative example of a circuit of the invention, the chamber 1 has a generated volume of 0.4 $cm^3$ with a stroke of 1 mm, and the chamber 23 a generated volume of 2 $cm^3$ with a stroke of 1 mm. The stepper motor 4 has a power of 20 watts a rotation cycle T2 of 0.3 seconds, and a stopping time T1 of 100 milliseconds. The total overall volume of the ink circuit is close to 500 $cm^3$; that of the reservoir 17 and 18 is of the order of 260 $cm^3$; and that of the removable reservoirs 15 and 16 is about 500 $cm^3$. The volume of the general duct 66 must be very small with respect to the volume generated by the chamber 1. In one embodiment, the chosen ratio is close to 4. The ducts corresponding to the restrictions 14, 12, 8 must have volumes greater than the volume generated by the chamber 1. In one embodiment, this ratio is 2. Finally, the duct of the restriction 10 must be as small as possible.

As has already been mentioned, such a supply circuit of the invention makes it possible to have access to multiple functions although its structure is extremely compact and its operation is very simple. It finds its applications particularly in the field of ink jet printing, not only within the field of industrial marking, but also in that of office automation.

I claim:

1. A cell to be integrated in a hydraulic circuit, which comprises:

(a) a stepper motor having a rotor;

(b) a pressure sensor;

(c) a variable volume chamber, which is connected to said pressure sensor and controlled by said stepper motor;

(d) a plurality of valves connected to said variable volume chamber, each of said valves being in communication with a restriction; and (e) means for opening and closing said valves electronically as a function of the position of said rotor of said stepper motor and allowing for opposite directions of movement of the fluid such that said cell is adapted to accomplish multiple functions, (f) wherein the maximum pressure difference generated at the ends of the restriction corresponding to the open valve is used to measure the viscosity of the fluid which flows through said open valve.

2. A cell according to claim 1, wherein said variable volume chamber comprises a piston secured to an eccentric driven by the rotor of the stepper motor controlled at a constant speed of rotation so that, all other parameters being equal, a diagram of the pressure differences, as a function of the position of the rotor, comprises a sinusoid period for a complete revolution of the rotor for ensuring synchronism of the valve controls as a function of the position of the piston.

3. A cell according to claim 1, wherein said cell comprises pumping means which is alternately in the open and closed position, at each half cycle, so that suction is created through the valve which is maintained open during a phase of increasing volume in the variable volume chamber and delivery occurs through the valve which is held open during a decreasing phase of said volume; the cyclic suction and delivery establishing a fluid flow through the hydraulic circuit.

4. A cell according to claim 1, which comprises means for establishing homogeneity of the fluid wherein at least one of said valves is maintained open.

5. A cell according to claim 2, which comprises means for establishing homogeneity of the fluid wherein at least one of said valves is maintained open.

6. A cell according to claim 1, which comprises means for detecting the position of the rotor of the motor through cooperation of the fluid and the pressure sensor wherein in a first case, two of said valves are kept in the closed position, the angular position of the rotor corresponding to a maximum point; and in a second case, one of the valves is open, the angular position of the rotor corresponding to a median position between the maximum point and a minimum point.

7. A cell according to claim 2, which comprises means for detecting the position of the rotor of the motor through cooperation of the fluid and the pressure sensor wherein in a first case, two of said valves are kept in the closed position, the angular position of the rotor corresponding to a maximum point; and in a second case, one of the valves is open, the angular position of the rotor corresponding to a median position between the maximum point and a minimum point.

8. A cell according to claim 1 wherein each restriction comprises a tube of a length greater than the diameter thereof in a ratio sufficient for the creation of a pressure drop in the case where a viscous fluid flows therethrough.

9. A cell according to claim 1, which comprises first and second assemblies for cooperating with a hydraulic circuit including printing head, such first and second assemblies each including a variable volume chamber associated with a plurality of valves, said two chambers being coupled mechanically to the same eccentric and one of said chambers being connected to the pressure sensor.

10. A cell according to claim 9, wherein said first assembly includes a duct connecting the variable volume chamber to a first ink reservoir, a solvent reservoir, an ink recovery reservoir and a second ink reservoir.

11. A cell according to claim 10, wherein said second assembly comprises a duct connecting the variable volume chamber on the one hand to a valve coupled to duct of said first assembly; on the other hand to a valve connected to the ink recovery reservoir on one side, to the ink recovery reservoir and on another side to a valve connected to a recovery gutter by a duct; and finally to a valve belonging to a circuit; the valve being connected to a printing head.

12. A cell according to claim 11, wherein said circuit comprises a connecting valve connecting the second ink reservoir to the printing head for generating the ink jet so as to be recoverable by the recovery gutter.

13. A cell according to claim 12, wherein said second ink reservoir includes an air pocket for maintaining the second ink reservoir under pressure, wherein the ink supplying the printing head occurs via said connecting valve.

14. A cell according to claim 13, wherein the first ink reservoir and solvent reservoir each have a flexible envelope containing respectively the ink and the solvent, which envelope is formed so that a depression of the liquid is created.

15. A cell according to claim 14, wherein when the motor accomplishes an operating cycle which includes a first stopping time followed by a second time corresponding to the complete rotation of said second time being constant.

16. A cell according to claim 15, wherein different operating cycles of said first and second assemblies are carried out by electrical control means for controlling the different valves synchronously at the instantaneous position of the rotor of the motor.

17. A cell according to claim 16, wherein said connecting valve is open and said ink jet is utilized, the addition of a dose of ink onto reservoir is obtained by causing the combination of said chamber with the plurality of valves and to operate as a pumping cell, operating at each half cycle respectively for suction and delivery for transferring the ink from the ink recovery reservoir to the second ink reservoir.

18. A cell according to claim 17, which comprises means for making a measurement during the stopping time of the pressure in the ink reservoir by placing said second ink reservoir directly in operational relation with the sensor.

19. A cell according to claim 16, which comprises means for maintaining one of said valves open during a complete cycle of the rotor.

20. A cell according to claim 19, which comprises means for transferring a dose of solvent from the solvent reservoir to the second ink reservoir by causing the combination of chamber with the plurality of valves and to operate as a pumping cell.

21. A cell according to claim 16, which comprises means for transferring, when the ink recovery reservoir is empty, the ink in the ink reservoir into the second ink reservoir by causing the chamber with said plurality of valves and to operate as a pumping cell.

22. A cell according to claim 16, which comprises means, during stopping of the motor, with the valve for the ink reservoir and the valve for the solvent reservoir kept open, for measuring the static pressure of the corresponding pocket by means of the sensor.

23. A cell according to claim 16, which comprises means for restoring the volume of air of the second ink reservoir.

24. A cell according to claim 16, which comprises means for pumping the ink collected from the recovery gutter through the duct to the ink recovery reservoir by means of the plurality of valves cooperating with the variable volume chamber.

25. A cell according to claim 16, which comprises means acting before stopping the operation for filling each valve of said first and second assemblies with solvent by successively pumping solvent into each of said plurality of valves, in cooperation with the valve associated with the solvent reservoir.

26. A cell according to claim 16, which comprises means for cleaning during a first phase consisting in pumping the ink from said ink reservoir into the second ink reservoir by means of the valves cooperating with the chamber; a second phase consisting of letting the ink contained under pressure in the second ink reservoir escape through the gutter by opening the plurality of valves; a third phase consisting in coupling the pumping cell operation of the plurality of valves cooperating with the chambers and; a fourth phase consisting in transferring the solvent to the ink recovery reservoir, then to the second ink reservoir before expelling it through one of said plurality of valves, the head and a second valve of said plurality of valves.

27. A cell according to claim 11, which comprises recovery circuit means for, on the one hand, cooperation of the second assembly with the two valves, assuring depressurization of the ink recovery reservoir and suction of the ink from the gutter towards said ink recovery reservoir through a duct connecting the gutter to the ink recovery reservoir; and on the other hand for ensuring recycling of the solvent condensate through cooperation of the first assembly with said plurality of valves.

28. A cell according to claim 27, which comprises means for removing air from the ink recovery reservoir to a duct connected to the outside by causing said second assembly and said two valves to function as an air pump exclusively, which results in transforming the ink recovery reservoir into a depression accumulator, in filtering the pulsations inherent in the pump and making possible suction of the ink taken from the gutter, via the duct connecting the gutter to the ink recovery reservoir.

29. A cell according to claim 28, in which:

(a) the ink recovery reservoir is placed in series in the duct connected to the outside;

(b) the ink recovery reservoir causes separation of the air and the solvent in the form of a condensate; and (c) the air and the excess of any volatile product escapes to the outside through the duct.

30. A cell according to claim 29, which comprises means for pumping said condensate.

31. A cell to be integrated into a hydraulic circuit, said cell comprising:

(a) a cylinder;

(b) a stepper motor containing a rotor;

(c) an eccentric operatively connected to and driven by said rotor;

(d) a piston displaceably mounted in said cylinder and operatively connected to said eccentric so that said piston defines a chamber in said cylinder the volume of which is variable;

(e) a pressure sensor operatively connected to said chamber;

(f) a fluid valve;

(g) first means for opening and closing said fluid valve;

(h) a first path of fluid communication leading from said chamber to said fluid valve;

(i) a second path of fluid communication leading from said fluid valve; and p'(j) a restriction located in said second path of fluid communication, said restriction being sized, shaped, and positioned so as to create a pressure difference between its upstream end and its downstream end when a flow of fluid with non zero viscosity passes through it.

32. A cell as recited in claim 31 wherein said first means comprises:

(a) second means for normally closing said fluid valve and (b) third means for opening said fluid valve against the bias of said second means.

33. A cell as recited in claim 32 wherein said third means comprises an electrical coil.

34. A cell as recited in claim 31 comprising:

(a) a plurality of fluid valves;

(b) a plurality of first means, each one of said plurality of first means being operatively associated with a corresponding one of said plurality of fluid valves;

(c) a plurality of first paths of fluid communication, each one of said plurality of first paths of fluid communication leading from said chamber to a corresponding one of said plurality of fluid valves;

(d) a plurality of second paths of fluid communication, each one of said plurality of second paths of fluid communication leading from a corresponding one of said plurality of fluid valves; and (e) a plurality of restrictions, each one of said plurality of restrictions being located in a corresponding one of said plurality of second paths of fluid communication.

35. A cell as recited in claim 31 wherein the length L of said restriction is appreciably greater than the inside diameter D of said restriction.

36. A cell as recited in claim 35 wherein the length L of said restriction is equal to about 15 times the inside diameter D of said restriction.

37. A cell as recited in claim 31 wherein:

(a) said stepper rotates said rotor at a constant speed of rotation and (b) said eccentric is:

(i) symmetrical and (ii) sized and shaped to generate a sinusoidal pressure curve in said chamber if the fluid in said chamber is single phase.

38. A cell to be integrated into a hydraulic circuit, said cell comprising:

(a) a cylinder;

(b) a stepper motor containing a rotor;

(c) an eccentric operatively connected to and driven by said rotor of said stepper motor;

(d) a piston displaceably mounted in said cylinder and operatively connected to said eccentric so that said piston defines a chamber in said cylinder the volume of which is variable;

(e) a pressure sensor operatively connected to said chamber;

(f) a first fluid valve;

(g) a first path of fluid communication leading from said chamber to said first fluid valve;

(h) a second path of fluid communication leading from said first fluid valve;

(j) a restriction located in said second path of fluid communication, said first restriction being sized, shaped, and positioned so as to create a pressure difference between its upstream end and its downstream end when a flow of fluid with non zero viscosity passes through it;

(j) a second fluid valve;

(k) a third path of fluid communication leading from said chamber to said second fluid valve;

(l) a fourth path of fluid communication leading from said second fluid valve;

(m) a second restriction located in said fourth path of fluid communication, said second restriction being sized, shaped, and positioned so as to create a pressure difference between its upstream end and its downstream end when a flow of fluid with non zero viscosity passes through it;

(n) first means for opening said valve during the half revolution of said rotor from its median position to its maximum position and back to its median position and for closing said first valve during the half revolution of said rotor from its median position to its minimum position and back to its median position; and (p) second means for opening said second valve during the half revolution of said rotor from its median position to its minimum position and back to its median position and for closing said second valve during the half revolution of said rotor from its median position to its maximum position and back to its median position.

39. A cell as recited in claim 38 wherein:

(a) said first means comprises:

(i) third means for normally closing said first fluid valve and (ii) fourth means for opening said first fluid valve against the bias of said second means and (b) said second means comprises:

(i) fifth means for normally closing said second fluid valve and (ii) sixth means for opening said second fluid valve against the bias of said fifth means.

40. A cell as recited in claim 39 wherein said fourth and sixth means each comprises an electrical coil.

41. A cell as recited in claim 38 wherein the length L of each of said first and second restrictions is appreciably greater than the inside diameter D of the corresponding one of said first and second restrictions.

42. A cell as recited in claim 41 wherein the length L of each one of said first and second restrictions is equal to about 15 times the inside diameter D of the corresponding one of said first and second restrictions.

43. A cell as recited in claim 38 wherein:

(a) said stepper motor rotates said rotor at a constant speed of rotation and (b) said eccentric is:

(i) symmetrical and (ii) sized and shaped to generate a sinusoidal pressure curve in said chamber if the fluid in said chamber is single phase.

44. An ink jet printing circuit comprising:

(a) a gutter;

(b) an ink jet printer in position to jet ink into said gutter;

(c) a first reservoir that, in use, contains reserve ink;

(d) a second reservoir that, in use, contains a pure solvent;

(e) a third reservoir that, in use:

(i) contains ink;

(ii) functions as a pressure accumulator; and (iii) contains a pressurized air pocket that functions as a damper;

(f) a fourth reservoir that, in use, contains air and ink recovered from said gutter;

(g) a first cylinder;

(h) a stepper motor containing a rotor;

(i) an eccentric operatively connected to and driven by said rotor of said stepper motor;

(j) a first piston displaceably mounted in said first cylinder and operatively connected to said eccentric so that said first piston defines a first chamber in said first cylinder the volume of which is variable;

(k) a pressure sensor operatively connected to said first chamber;

(l) a first fluid valve;

(m) a first means for opening and closing said first fluid valve;

(n) a first path of fluid communication leading from said first chamber to said first fluid valve;

(o) a second path of fluid communication leading from said first fluid valve to the bottom of said first reservoir;

(p) a first restriction located in said second path of fluid communication, said first restriction being sized, shaped, and positioned so as to create a pressure difference between its upstream end and its downstream end when a flow of fluid with non zero viscosity passes through it;

(q) a second fluid valve;

(r) second means for opening and closing said second fluid valve;

(s) a third path of fluid communication leading from said first chamber to said second fluid valve;

(t) a fourth path of fluid communication leading from said second fluid valve to the bottom of said second reservoir;

(u) a second restriction located in said fourth path of fluid communication, said second restriction being sized, shaped, and positioned so as to create a pressure difference between its upstream end and its downstream end when a flow of fluid with non zero viscosity passes through it;

(v) a third fluid valve;

(w) a third means for opening and closing said third fluid valve;

(x) a fifth path of fluid communication leading from said first chamber to said third fluid valve;

(y) a sixth path of fluid communication leading from said third valve to the bottom of said third reservoir;

(z) a third restriction located in said sixth path of fluid communication, said third restriction being sized, shaped, and positioned so as to create a pressure difference between its upstream end and its downstream end when a flow of fluid with non zero viscosity passes through it;

(aa) a fourth fluid valve;

(ab) fourth means for opening and closing said fourth fluid valve;

(ac) a seventh path of fluid communication leading from said first chamber to said fourth fluid valve;

(ad) an eighth path of fluid communication leading from said fourth fluid valve to the bottom of said fourth reservoir;

(ae) a fourth restriction located in said eighth path of fluid communication, said fourth restriction being sized, shaped, and positioned so as to create a pressure difference between its upstream end and its downstream end when a flow of fluid with non zero viscosity passes through it;

(af) a fifth fluid valve;

(ag) fifth means for opening and closing said fifth fluid valve;

(ah) a ninth path of fluid communication leading from the bottom of said fourth reservoir to said fifth fluid valve; and (ai) a tenth path of fluid communication leading from said fifth fluid valve to said ink jet printer.

45. An ink jet printing circuit as recited in claim 44 wherein said first reservoir is removable.

46. An ink jet printing circuit as recited in claim 44 wherein said second reservoir is removable.

47. An ink jet printing circuit as recited in claim 44 wherein said third and fourth reservoirs have the same voltage.

48. An ink jet printing circuit as recited in claim 44 wherein said first, third, fifth, and seventh paths of fluid communication each comprises a general duct.

49. An ink jet printing circuit as recited in claim 44 wherein said third reservoir is vented to atmosphere.

50. An ink jet printer circuit as recited in claim 44 and further comprising:

(a) a second cylinder;

(b) a second piston displaceably mounted in said second cylinder and operatively connected to said eccentric so that said second piston defines a second chamber in said second cylinder the volume of which is variable;

(c) a sixth fluid valve;

(d) sixth means for opening and closing said sixth fluid valve;

(e) an eleventh path of fluid communication leading from said second chamber to said sixth fluid valve;

(f) a twelfth path of fluid communication leading from said sixth fluid valve to said third fluid valve;

(g) a seventh fluid valve;

(h) seventh means for opening and closing said seventh fluid valve;

(i) a thirteenth path of fluid communication leading from said second chamber to said seventh fluid valve;

(j) a fourteenth path of fluid communication leading from said seventh fluid valve to the top of said third reservoir;

(k) an eighth fluid valve;

(l) eighth means for opening and closing said eighth fluid valve;

(m) a fifteenth path of fluid communication leading from said second chamber to said eighth fluid valve;

(n) a sixteenth path of fluid communication leading from said eighth fluid valve to said gutter;

(o) a seventeenth path of fluid communication leading from said eighth fluid valve to said seventh fluid valve;

(p) a ninth fluid valve;

(q) ninth means for opening and closing said ninth fluid valve;

(r) an eighteenth path of fluid communication leading from said second chamber to said ninth fluid valve; and (s) a ninteenth path of fluid communication leading from said ninth fluid valve to said ink jet printer.

51. An ink jet printing circuit as recited in claim 50 wherein said first, third, fifth, and seventh paths of fluid communication each comprises a general duct.

52. An ink jet printing circuit as recited in claim 51 wherein said twelfth path of fluid communication is in fluid communication with said general duct.

53. An ink jet printing circuit as recited in claim 50 wherein said third reservoir is vented to atmosphere.

54. An ink jet printing circuit as recited in claim 44 and further comprising:

(a) a second cylinder;

(b) a second piston displaceably mounted in said second cylinder and operatively connected to said eccentric so that said second piston defines a second chamber in said second cylinder the volume of which is variable;

(c) a sixth fluid valve;

(d) sixth means for opening and closing said sixth fluid valve;

(e) an eleventh path of fluid communication leading from said second chamber to said sixth fluid valve;

(f) a twelfth path of fluid communication leading from said sixth fluid valve to the top of said third reservoir;

(g) a seventh fluid valve;

(h) seventh means for opening and closing said seventh fluid valve;

(i) a thirteenth path of fluid communication leading from said second chamber to said seventh fluid valve;

(j) a condenser;

(k) a fourteenth path of fluid communication leading from said seventh fluid valve to the top of said condenser;

(l) a fifth restriction located in said fourteenth path of fluid communication, said fifth restriction being sized, shaped, and positioned so as to create a pressure difference between its upstream end and its downstream end when a flow of fluid with non zero viscosity passes through it;

(m) an eighth fluid valve;

(n) eighth means for opening and closing said eighth fluid valve;

(o) a sixteenth path of fluid communication leading from said eighth fluid valve to said general duct;

(p) a vent in the top of said condenser;

(q) a ninth fluid valve;

(r) ninth means for opening and closing said ninth fluid valve;

(s) a seventeenth path of fluid communication leading from said ink jet printer to said ninth fluid valve;

(t) an eighteenth path of fluid communication leading from said ninth fluid valve to the top of said third reservoir; and (u) a ninteenth path of fluid communication leading from the top of said third reservoir to said gutter.

* * * * *